US009608536B2

(12) United States Patent
Kawamura

(10) Patent No.: US 9,608,536 B2
(45) Date of Patent: *Mar. 28, 2017

(54) ELECTRIC-POWER CONVERSION SYSTEM INCLUDING SINGLE-PHASE INVERTER

(71) Applicant: Mitsubishi Electric Corporation, Chiyoda-ku, Tokyo (JP)

(72) Inventor: Mao Kawamura, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/882,523

(22) Filed: Oct. 14, 2015

(65) Prior Publication Data

US 2016/0036347 A1    Feb. 4, 2016

Related U.S. Application Data

(62) Division of application No. 14/002,786, filed on Sep. 3, 2013, now Pat. No. 9,484,831.

(30) Foreign Application Priority Data

Jul. 6, 2011    (JP) .................................. 2011-149764
Mar. 13, 2012  (WO) .................. PCT/JP2012/056345

(51) Int. Cl.
  *H02H 7/122*  (2006.01)
  *H02M 7/06*   (2006.01)
  (Continued)

(52) U.S. Cl.
  CPC ............. *H02M 7/066* (2013.01); *H02M 1/42* (2013.01); *H02M 1/4208* (2013.01);
  (Continued)

(58) Field of Classification Search
  CPC .... H02M 1/42; H02M 1/4208; H02M 1/4233; H02M 7/066; H02M 7/125; Y02B 70/126
  (Continued)

(56) References Cited

U.S. PATENT DOCUMENTS 6,930,483 B2 * 8/2005 Sabate ............... G01R 33/3614
                                               324/309
7,598,714 B2 * 10/2009 Stanley ..................... H03F 1/32
                                               323/222
(Continued)

FOREIGN PATENT DOCUMENTS

CN   1909319 A    2/2007
JP   62-107591 U  7/1987
(Continued)

OTHER PUBLICATIONS

Communication dated Sep. 2, 2015, issued by the European Patent Office in corresponding European Application No. 12807802.9.
(Continued)

*Primary Examiner* — Jessica Han
*Assistant Examiner* — Lorena Bruner
(74) *Attorney, Agent, or Firm* — Sughrue Mion, PLLC; Richard C. Turner

(57) ABSTRACT

The number of constituent components is reduced so as to provide a small-size and inexpensive electric-power conversion system. The electric-power conversion system is provided with an inverter circuit (14) connected with the rear stage of an AC power source, a smoothing capacitor (22) connected with the rear stage of the inverter circuit (14) by way of a rectifying device (20), a charging switch (2) that is connected with the front stage of the inverter circuit (14), that inputs an electric quantity based on an output of the AC power source (1) to the inverter circuit (14) when being turned on, and that cuts off an input of the electric quantity to the inverter circuit (14) when being turned off, and an inrush current prevention circuit (7) having an inrush current prevention switch (3) and an inrush current prevention resistor (4) that is connected in series with the rear stage of the inrush current prevention switch (3); the electric-power conversion system is characterized in that the inrush current (Continued)

prevention circuit (7) is connected in parallel with the charging switch (2).

14 Claims, 17 Drawing Sheets

(51) Int. Cl.
 *H02M 7/12* (2006.01)
 *H02M 1/42* (2007.01)

(52) U.S. Cl.
 CPC ......... *H02M 1/4233* (2013.01); *H02M 7/125* (2013.01); *Y02B 70/126* (2013.01)

(58) Field of Classification Search
 USPC ........................................................... 363/55
 See application file for complete search history.

(56) References Cited

U.S. PATENT DOCUMENTS

| | | | |
|---|---|---|---|
| 7,746,040 B2* | 6/2010 | Garrity | H02M 1/4225 323/207 |
| 2004/0160128 A1 | 8/2004 | Athari | |
| 2005/0017695 A1* | 1/2005 | Stanley | H02M 1/4208 323/207 |
| 2005/0286276 A1* | 12/2005 | Kubo | H02J 7/0034 363/55 |
| 2006/0033480 A1 | 2/2006 | Soldano | |
| 2006/0232253 A1 | 10/2006 | Salato et al. | |
| 2011/0115416 A1* | 5/2011 | Oh | B60L 11/1803 318/139 |
| 2012/0014139 A1 | 1/2012 | Yamada et al. | |

FOREIGN PATENT DOCUMENTS

| | | |
|---|---|---|
| JP | 06-245485 A | 9/1994 |
| JP | 08-033338 A | 2/1996 |
| JP | 2005-318754 A | 11/2005 |
| JP | 2009-095160 A | 4/2009 |
| WO | 2004042793 A2 | 5/2004 |
| WO | 2007/129469 A1 | 11/2007 |
| WO | 2010113218 A1 | 10/2010 |

OTHER PUBLICATIONS

Communication dated Apr. 9, 2015 from the State Intellectual Property Office of the P.R.C. in counterpart application No. 201280019172.2.

* cited by examiner

ELECTRIC-POWER CONVERSION SYSTEM INCLUDING SINGLE-PHASE INVERTER

CROSS-REFERENCE TO RELATED APPLICATIONS

This application is a Divisional of U.S. application Ser. No. 14/002,786 filed Sep. 3, 2013, which is a §371 National Stage Application of PCT/JP2012/056345 filed Mar. 13, 2012; claiming priority of JPA No. 2011-149764 filed Jul. 6, 2011, the above-noted applications are incorporated herein by reference in their entirety.

TECHNICAL FIELD

The present invention relates to an electric-power conversion system for converting AC electric power into DC electric power and more particularly to an electric-power conversion system provided with a circuit for raising the input power factor.

BACKGROUND ART

As a conventional electric-power conversion system, a technology disclosed in Patent Document 1 is known. As illustrated in FIG. 17, the conventional electric-power conversion system includes a diode bridge 12 connected with an AC power source 1 by way of a main relay 10; an inverter circuit 14 connected with the rear stage of the diode bridge 12 by way of an inrush current prevention resistor 4 and a reactor 13 and formed of a single-phase inverter configured with a DC voltage source 19, diodes 15 and 16, and semiconductor switching devices 17 and 18; and a smoothing capacitor 22 connected with the rear stage of the inverter circuit 14 by way of a rectifier diode 20 and a short-circuiting switch 21.

A charging relay 2a is connected in parallel with the inrush current prevention resistor 4. The positive electrode of the smoothing capacitor 22 is provided between the inrush current prevention resistor 4 and the reactor 13, by way of a discharging resistor 11 and a discharging relay 5a. In addition, reference numerals 31, 32, and 33 denote a rectified voltage detection circuit, a DC voltage detection circuit, and a smoothing capacitor voltage detection circuit, respectively.

In the conventional electric-power conversion circuit configured in such a manner, full wave rectification is applied to an AC input from the AC power source 1 and then is inputted to the inverter circuit 14 by way of the reactor 13. The inverter circuit 14 PWM-controls an input current from the diode bridge 12 in such a way that the power factor of the input from the AC power source 1 becomes approximately "1" and accumulates energy in the DC voltage source 19; concurrently, the inverter circuit 14 makes the DC voltage across the smoothing capacitor 22 keep track of a predetermined target voltage. Such a conventional electric-power conversion system can improve the input power factor and reduce the power loss and noise.

PRIOR ART REFERENCE

Patent Document

[Patent Document 1] Japanese Patent Application Laid-Open No. 2009-95160

DISCLOSURE OF THE INVENTION

Problems to be Solved by the Invention

However, in order to perform charging operation for charging the smoothing capacitor 22, the foregoing conventional electric-power conversion system requires the main relay 10 for establishing or breaking connection between the AC power source 1 and the electric-power conversion system and the charging relay 2a for short-circuiting the inrush current prevention resistor 4 that prevents an inrush current at a time when the operation thereof is started.

In general, among electronic-component faults induced by siloxane, a relay-contact fault is dominant; in the case where silicone, which may produce low-molecular siloxane, is utilized in an enclosed component, movement heat of the component produces siloxane, which adheres to the relay contact. In particular, in the case of a relay that is frequently turned on and off, impact is constantly exerted onto the contacts; therefore, there has been a problem that siloxane that adheres to the surface of the contact is oxidation-decomposed into carbon dioxide ($SiO_2$), which provides an effect as an electric insulator and causes a contact fault. For example, the foregoing problem is posed when a material including silicone is utilized as a component adhesive or a heat radiation sheet. Therefore, it is considered that it is better not to frequently use a relay.

When, as a switch, a semiconductor device such as a MOSFET (Metal Oxide Semiconductor Field Effect Transistor) or an IGBT (Insulated Gate Bipolar Transistor) is utilized instead of a relay, the power loss becomes large because the on-resistance of the semiconductor switching device is higher than that of a relay. Therefore, in terms of raising the efficiency of an electric-power conversion system, it is better to utilize a relay instead of a semiconductor switching device.

In the foregoing conventional electric-power conversion system, it is required to provide the inrush current prevention resistor 4 for prevent an inrush current at a time when the operation starts and the discharging resistor 11 for discharging, at a time when the operation ends, electric charges accumulated in the smoothing capacitor 22; however, those resistors are expensive and utilizing those resistors is wasteful because those resistors are not utilized during normal operation. Accordingly, there has been a problem that the electric-power conversion system is upsized and the production cost increases.

The present invention has been implemented in order to solve the foregoing problems in conventional electric-power conversion systems; the objective thereof is to decrease the number of constituent components and to provide a small-size and inexpensive electric-power conversion system.

Means for Solving the Problems

An electric-power conversion system according to the present invention is provided with an inverter circuit connected with the rear stage of an AC power source, a smoothing capacitor connected with the rear stage of the inverter circuit by way of a rectifying diode, a charging switch that is connected with the front stage of the inverter circuit, that inputs an electric quantity based on an output of the AC power source to the inverter circuit when being turned on, and that cuts off an input of the electric quantity to the inverter circuit when being turned off, and an inrush current prevention circuit having an inrush current prevention switch and an inrush current prevention resistor that is connected in series with the rear stage of the inrush current prevention switch; the electric-power conversion system is characterized in that the inrush current prevention circuit is connected in parallel with the charging switch.

An electric-power conversion system according to the present invention is provided with an AC/DC converter configured with a rectification circuit that is connected with the rear stage of an AC power source and rectifies the output of the AC power source and a semiconductor switching device connected between the output terminals of the rectification circuit, a smoothing capacitor connected with the rear stage of the AC/DC converter by way of a rectifying diode, a charging switch that is connected between the rear stage of the rectification circuit and the semiconductor switching device, that inputs an output of the rectification circuit to the semiconductor switching device when being turned on, and that cuts off an input to the semiconductor switching device when being turned off, and an inrush current prevention circuit having an inrush current prevention switch and a resistor that is connected with the rear stage of the inrush current prevention switch; the electric-power conversion system is characterized in that the inrush current prevention circuit is connected in parallel with the charging switch.

Advantage of the Invention

An electric-power conversion system according to the present invention is provided with an inverter circuit connected with the rear stage of an AC power source, a smoothing capacitor connected with the rear stage of the inverter circuit by way of a rectifying diode, a charging switch that is connected with the front stage of the inverter circuit, that inputs an electric quantity based on an output of the AC power source to the inverter circuit when being turned on, and that cuts off an input of the electric quantity to the inverter circuit when being turned off, and an inrush current prevention circuit having an inrush current prevention switch and an inrush current prevention resistor that is connected in series with the rear stage of the inrush current prevention switch; the inrush current prevention circuit is connected in parallel with the charging switch. As a result, as the inrush current prevention switch, a semiconductor switching device can be utilized, and the electric-power conversion system can be configured in such a way that only one charging switch is utilized when electric-power conversion is performed; therefore, it is made possible that the problem of relay contact failure caused by low-molecular siloxane is suppressed, that the safety of the circuit is improved, and that the system is prevented from becoming large-scale and becoming expensive.

An electric-power conversion system according to the present invention is provided with an AC/DC converter configured with a rectification circuit that is connected with the rear stage of an AC power source and rectifies the output of the AC power source and a semiconductor switching device connected between the output terminals of the rectification circuit, a smoothing capacitor connected with the rear stage of the AC/DC converter by way of a rectifying diode, a charging switch that is connected between the rear stage of the rectification circuit and the semiconductor switching device, that inputs an output of the rectification circuit to the semiconductor switching device when being turned on, and that cuts off an input to the semiconductor switching device when being turned off, and an inrush current prevention circuit having an inrush current prevention switch and a resistor that is connected with the rear stage of the inrush current prevention switch; the inrush current prevention circuit is connected in parallel with the charging switch. As a result, as the inrush current prevention switch, a semiconductor switching device can be utilized, and the electric-power conversion system can be configured in such a way that only one charging switch is utilized when electric-power conversion is performed; therefore, it is made possible that the problem of relay contact failure caused by low-molecular siloxane is suppressed, that the safety of the circuit is improved, and that the system is prevented from becoming large-scale and becoming expensive.

BEST MODE FOR CARRYING OUT THE INVENTION

Embodiment 1

Figure 1:
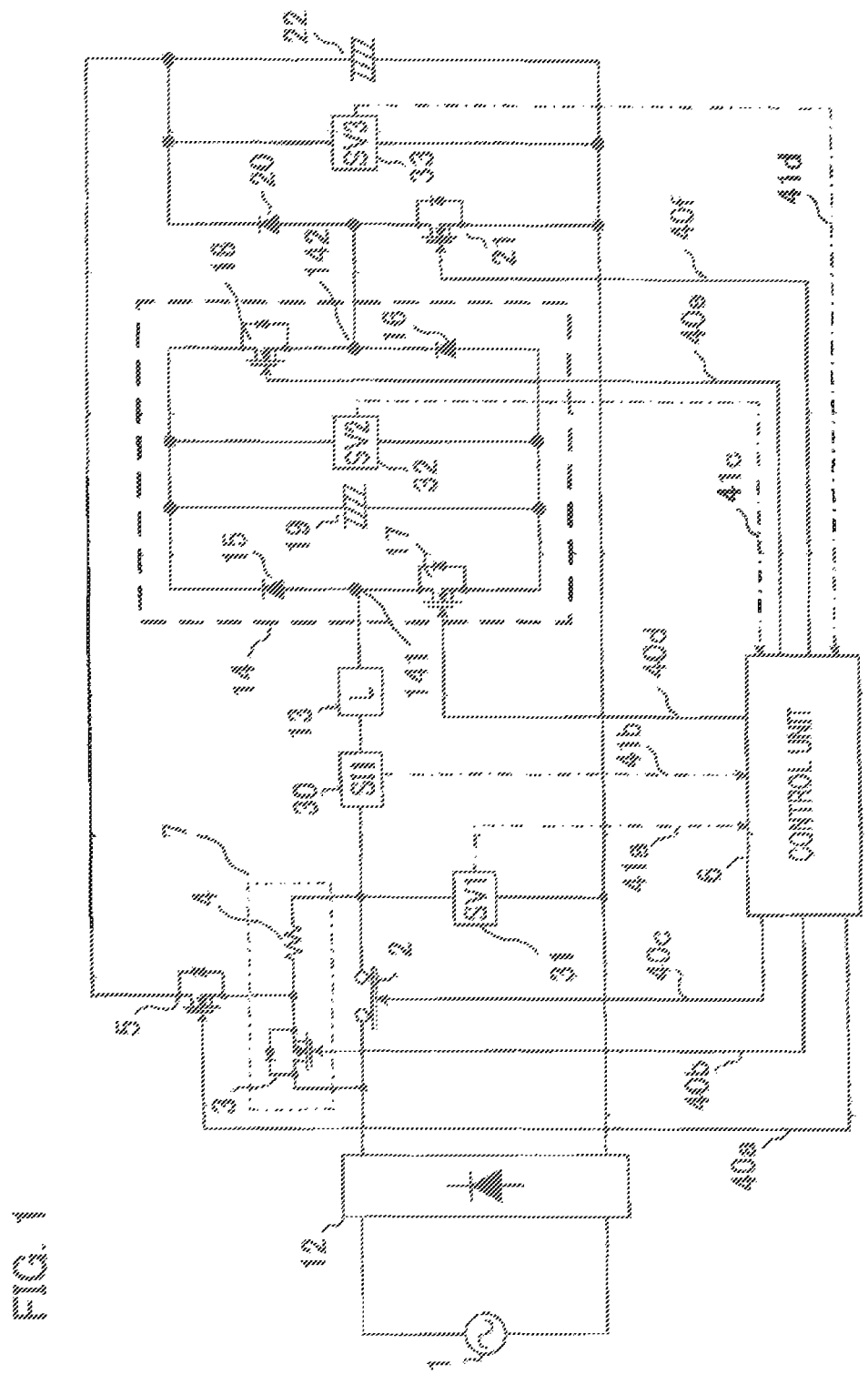
FIG. 1 is a configuration diagram of an electric-power conversion system according to Embodiment 1 of the present invention.

Hereinafter, there will be explained an electric-power conversion system according to Embodiment 1 of the present invention. FIG. 1 is a configuration diagram of an electric-power conversion system according to Embodiment 1 of the present invention. In FIG. 1, the electric-power conversion system is configured with elements including a diode bridge 12, which is a rectification circuit for applying full-wave rectification to an AC input from an AC power source 1, a plurality of elements, described later, and a smoothing capacitor 22, in that order. In the following explanation, one side, of the drawing, that is closer to the diode bridge 12 than the other side thereof when the smoothing capacitor 22 is viewed from the diode bridge 12, i.e., that is farther from the smoothing capacitor 22 will be referred to as a front stage; the other side, of the drawing, that is farther from the diode bridge 12 than the one side thereof, i.e., that is closer to the smoothing capacitor 22 will be referred to as a rear stage. Accordingly, the smoothing capacitor 22 is disposed at the rearmost stage of the electric-power conversion system.

In a stage following the diode bridge 12, a charging relay 2 as a charging switch, a rectified current detection circuit 30 as a current detection unit, and a reactor 13 as a current limiting unit are provided in a sequential and a serial manner. An inrush current prevention circuit 7 is formed of a member in which an inrush current prevention switch 3 and an inrush current prevention resistor 4 are connected in series with each other, and is connected in parallel with the charging relay 2. The inrush current prevention switch 3 is formed of a MOSFET with which a diode is connected in an anti-parallel manner or an IGBT with which a diode is connected in an anti-parallel manner. The rectified voltage detection circuit 31 as a current detection circuit is provided in such a way as to be in parallel with the diode bridge 12.

An inverter circuit 14 formed of a single-phase inverter is connected with the rear stage of the reactor 13 connected with the positive electrode side of the diode bridge 12. The inverter circuit 14 is formed of a bridge circuit including a first diode 15, a first semiconductor switching device 17 connected with the anode of the first diode 15, a second diode 16, and a second semiconductor switching device 18 connected with the cathode of the second diode 16. Each of the first semiconductor switching device 17 and the second semiconductor switching device 18 is formed of a MOSFET or an IGBT with which a diode is connected in an anti-parallel manner.

The inverter circuit 14 is formed of a single-phase inverter circuit including a first serial circuit in which the first semiconductor switching device 17 and the first diode 15 are connected in series with each other, a second serial circuit in which the second semiconductor switching device 18 and the second diode 16 are connected in series with each other, and a DC voltage source 19; the first serial circuit and the second serial circuit are connected in series with each other, and the DC voltage source 19 is connected between the parallel connection points of the first serial circuit and the second serial circuit.

One terminal 141, at which the first semiconductor switching device 17 and the first diode 15 of the inverter circuit 14 are connected with each other, is connected with the output terminal of the reactor 13. The reactor 13 may be connected with the rear stage of the inverter circuit 14.

The other terminal 142, at which the second semiconductor switching device 18 and the second diode 16 of the inverter circuit 14 are connected with each other, is connected with one terminal of a short-circuiting switch 21 and the anode of a rectifier diode 20 as a rectifying device. The positive electrode, i.e., one terminal, of the smoothing capacitor 22 is connected with the cathode of the rectifier diode 20 and one terminal of an after-mentioned discharging switch 5; the negative electrode, i.e., the other terminal, of the smoothing capacitor 22 is connected with the other terminal of the short-circuiting switch 21 and the negative electrode of the diode bridge 12. The smoothing capacitor voltage detection circuit 33 as a voltage detection unit is connected in parallel with the smoothing capacitor 22. The short-circuiting switch 21 is formed of a MOSFET or an IGB with which a diode is connected in an anti-parallel manner.

One terminal of the discharging switch 5 is connected with the positive electrode of the smoothing capacitor 22 and the cathode of the rectifier diode 20; the other terminal thereof is connected with the connection point between the inrush current prevention resistor 4 and the inrush current prevention switch 3. The discharging switch 5 is formed of a MOSFET or an IGB with which a diode is connected in an anti-parallel manner.

The rectified current detection circuit 30 as a current detection unit inputs the detection value of an output current from the diode bridge 12 to a control unit 6 by way of a signal line 41; the rectified voltage detection circuit 31 inputs the detection value of an output voltage from the diode bridge 12 to the control unit 6 by way of a control line 41a. A DC voltage source voltage detection circuit 32 inputs the detection value of a voltage across the DC voltage source 19 to the control unit 6 by way of a control line 41c; a smoothing capacitor voltage detection circuit 33 inputs the detection value of a voltage across the smoothing capacitor 22 to the control unit 6 by way of a control line 41d.

By way of control lines 40a, 40b, 40d, 40e, and 40f, the control unit 6 is connected with the respective gate terminals of the discharging switch 5, the inrush current prevention switch 3, the first semiconductor switch 17, the second semiconductor switching device 18, and the short-circuiting switch 21 and performs ON/OFF-control of the discharging switch 5, the inrush current prevention switch 3, the first semiconductor switch 17, the second semiconductor switching device 18, and the short-circuiting switch 21.

Although as the short-circuiting switch 21, there has been described one short-circuiting switch formed of a MOSFET or an IGB with which a diode is connected in an anti-parallel manner, the present invention is not limited thereto; the short-circuiting switch 21 may be a mechanical switch.

Figure 2:
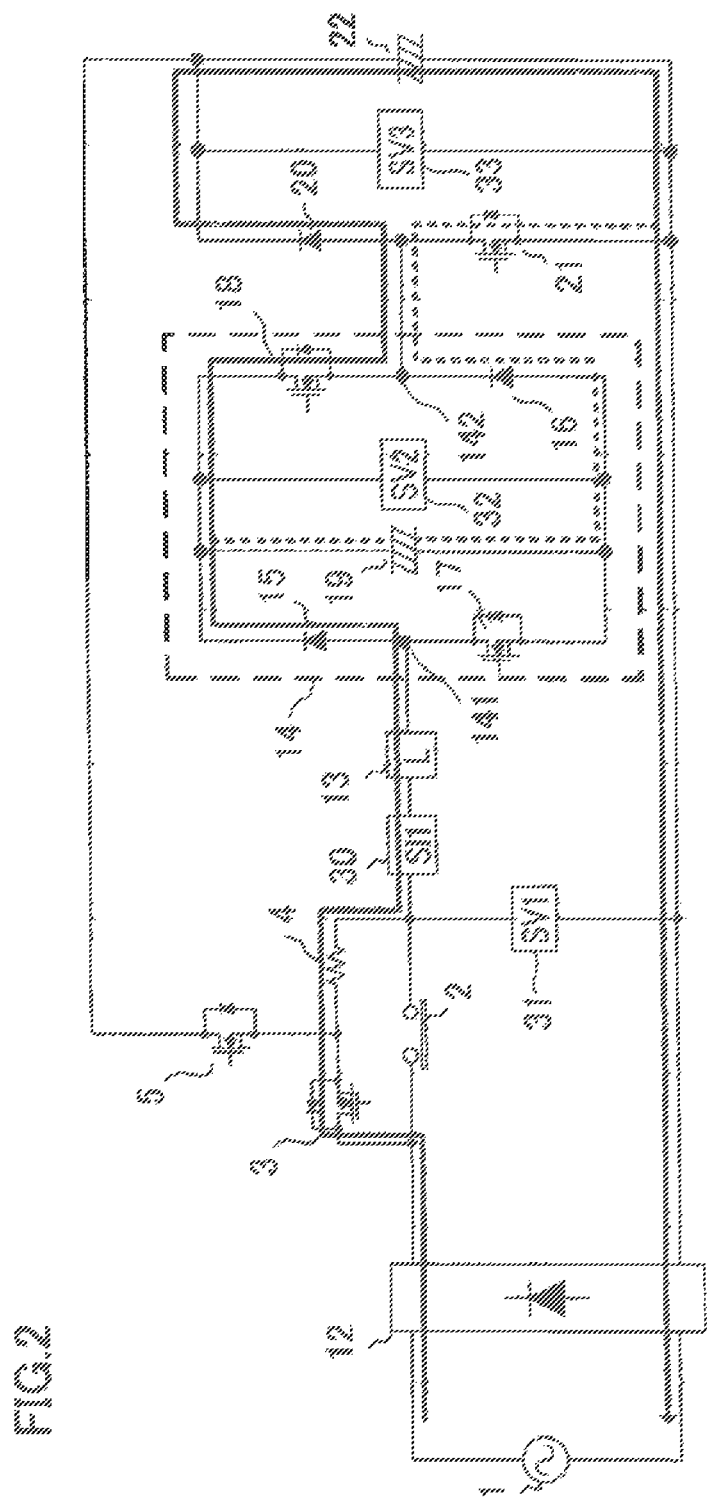
FIG. 2 is an explanatory diagram for explaining the operation of preventing an inrush current in an electric-power conversion system according to Embodiment 1 of the present invention.

Next, the operation of an electric-power conversion system according to Embodiment 1 of the present invention will be explained. At a startup time, i.e., when the electric-power conversion system starts its operation, an inrush current flows into the electric-power conversion system immediately after the AC power source 1 is turned on; thus, the control unit 6 turns off the charging relay 2 by way of a control line 40c and turns on the inrush current prevention switch 3 by way of the control line 40b. FIG. 2 is an explanatory diagram for explaining the operation of preventing an inrush current in an electric-power conversion system according to Embodiment 1 of the present invention. At a time when the operation is started, the charging relay 2 is turned off and the inrush current prevention switch 3 is turned on, so that as indicated by a thick solid line in FIG. 2, an inrush current flows in a path that passes through the AC power source 1, the diode bridge 12, the inrush current prevention switch 3, the inrush current prevention resistor 4, the reactor 13, the first diode 15 and the second semiconductor switch 18 of the inverter 14, the rectifier diode 20, the smoothing capacitor 22, and the diode bridge 12, in that order. The value of the rush current is reduced by the inrush current prevention resistor 4.

Then, after confirming that the voltage value of the DC voltage source 19 and the voltage value of the smoothing capacitor 22 inputted thereto from the DC voltage source voltage detection circuit 32 and the smoothing capacitor voltage detection circuit 33 by way of the control lines 41c and 41d, respectively, are the same as or higher than predetermined values, the control unit 6 turns on the charging relay 2 by way of the control line 40c and turns off the inrush current prevention switch 3 by way of the control line 40d; after that, the control unit 6 starts to perform electric-power conversion.

Figure 3:
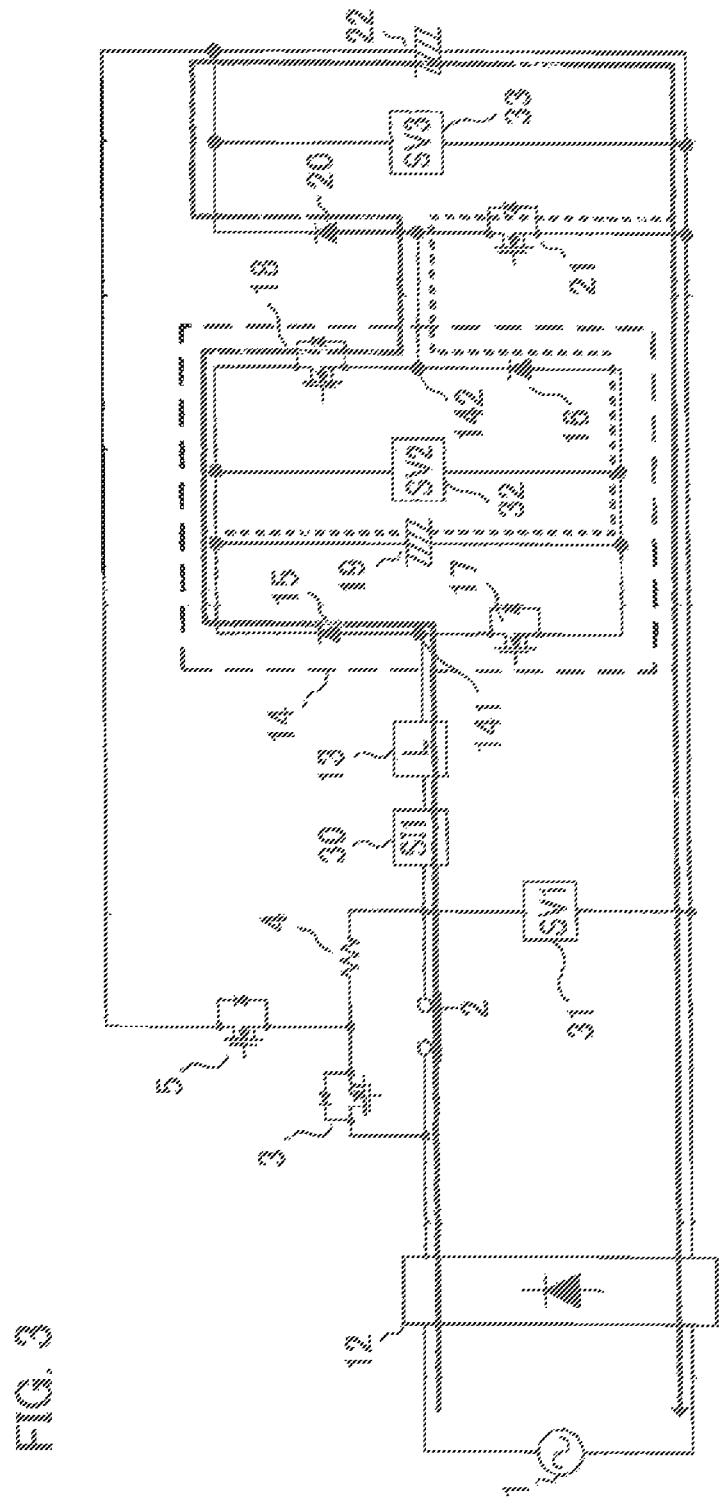
FIG. 3 is an explanatory diagram representing the path of a current flowing during electric-power conversion in an electric-power conversion system according to Embodiment 1 of the present invention.

FIG. 3 is an explanatory diagram representing the path of a current flowing during electric-power conversion in an electric-power conversion system according to Embodiment 1 of the present invention. As indicated by a thick solid line or by a thick solid line that is partially changed by a dotted line in FIG. 3, when the charging relay 2 is turned on and the inrush current prevention switch 3 is turned off, there is established a current path that passes through the AC power source 1, the diode bridge 12, the reactor 13, the inverter circuit 14, the smoothing capacitor 22, the diode bridge 12, and the AC power source 1, in that order; then, normal electric-power conversion, described below, is performed.

In other words, when charging relay 2 is turned on and the inrush current prevention switch 3 is turned off, the output, of the AC power source 1, that has been full-wave-rectified by the diode bridge 12 is applied between the one terminal 141 of the inverter circuit 14 and the negative electrode of the smoothing capacitor 22, by way of the charging relay 2. The peal value of the input voltage to be inputted to the inverter circuit 14 is set to a value that is slightly higher than the DC voltage across the smoothing capacitor 22, which is controlled so as to be a target voltage.

In this situation, when the control unit 6 turns off both the first semiconductor switching device 17 and the second semiconductor switching device 18 of the inverter circuit 14 by way of the control lines 40d and 40e, respectively, the DC voltage source 19 is charged with the input current, from the diode bridge 12, that flows through the reactor 13, the one terminal 141 of the inverter circuit 14, and the first diode 15, in that order; then, the input current is outputted from the other terminal 142. When the control unit 6 turns on only the first semiconductor switching device 17, the input current from the diode bridge 12 passes through the first semiconductor switching device 17 and the second diode 16, in that order, and then is outputted from the other terminal 142 of the inverter circuit 14.

When the control unit 6 turns on only the second semiconductor switching device 18 of the inverter circuit 14, the input current that has been inputted to the one terminal 141 of the inverter circuit 14 from the diode bridge 12 passes through the first diode 15 and the second semiconductor switching device 18, in that order, and then is outputted from the other terminal 142 of the inverter circuit 14. When the control unit 6 turns on the first semiconductor switching device 17 and the second semiconductor switching device 18 at the same time, the input current that has been inputted to the one terminal 141 of the inverter circuit 14 from the diode bridge 12 passes through the first semiconductor switching device 17, thereby making the DC voltage source 19 discharge electricity, and is outputted from the output terminal 142 by way of the second semiconductor switching device 18.

As described above, the control unit 6 performs 4 kinds of combination control of the first semiconductor switching device 17 and the second semiconductor switching device 18. In addition, by performing PWM-control of the inverter circuit 14, the control unit 6 controls the input current in such a way that the input power factor of the AC power source 1 becomes approximately "1"; concurrently the control unit 6 superimposes the voltage generated by the inverter 14 on the input voltage. By way of the control line 40f, the short-circuiting switch 21 is controlled by the control unit 6 so as to be turned on only in a short-circuiting phase range whose center is the zero-cross phase of the input voltage or the input current, so that the DC voltage across the smoothing capacitor 22 keeps track of a predetermined target voltage. Through such control described above, the electric-power conversion system according to Embodiment 1 of the present invention operates so as to improve the input power factor and to reduce the power loss and noise.

Next, there will be explained the operation of the smoothing capacitor 22 and the DC voltage source 19 at a time when discharging is performed in the electric-power conversion system according to Embodiment 1 of the present invention. When electricity is discharged from the smoothing capacitor 22 or when electricity is discharged from the DC voltage source 19, the control unit 6 turns off the charging relay 2 and the inrush current prevention switch 3 so that no electric power is supplied by the AC power source 1.

It is not preferable that electricity is discharged from the smoothing capacitor 22 and the DC voltage source 19 at the same time. This is because there exists a demerit that when electricity is discharged from the smoothing capacitor 22 and the DC voltage source 19 at the same time, an excessive current flows into the inrush current prevention resistor 4 and hence it is required to select the inrush current prevention resistor 4 of a rating that can withstand the excessive current, thereby upsizing the inrush current prevention resistor 4 and increasing the cost.

For example, in the case where a voltage higher than the rated voltage of the DC voltage source 19 is applied across the smoothing capacitor 22 and then electricity is discharged from the DC voltage source 19 and the smoothing capacitor 22 at the same time, the voltage across the smoothing capacitor 22 is applied to the DC voltage source 19 and exceeds the rating of the DC voltage source 19; thus, the DC voltage source 19 or surrounding devices thereof may be broken. Therefore, in order to avoid this, it is eventually required to raise the ratings of the DC voltage source and the like; thus, the electric-power conversion system is upsized.

Accordingly, in order to separately perform electricity discharging from the smoothing capacitor 22 and the DC voltage source 19, the first semiconductor switching device 17, the second semiconductor switching device 18, and the short-circuiting switch 21 are controlled in such a manner as described below so that the inrush current prevention resistor 4 is downsized.

Figure 4:
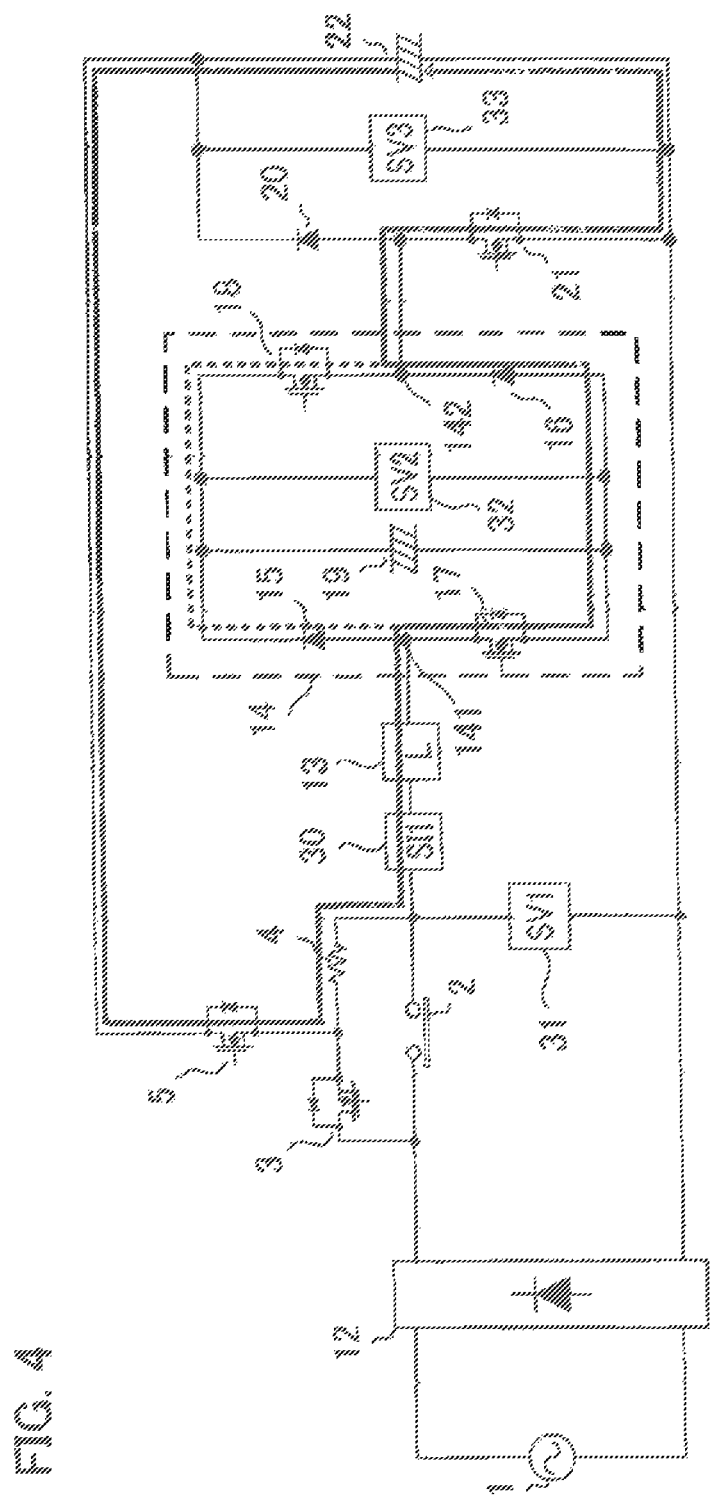
FIG. 4 is an explanatory diagram representing the path of a current flowing when electricity is discharged from a smoothing capacitor in an electric-power conversion system according to Embodiment 1 of the present invention.

Firstly, the operation of the smoothing capacitor 22 at a time when the discharging is performed will be explained. FIG. 4 is an explanatory diagram representing the path of a current flowing when electricity is discharged from the smoothing capacitor in the electric-power conversion system according to Embodiment 1 of the present invention; a thick solid line indicates the path through which immediately after the discharging starts, the electric charges that have been accumulated in the smoothing capacitor 22 flow into the electric-power conversion system according to Embodiment 1 of the present invention.

In FIG. 4, as described above, when electricity is discharged from the smoothing capacitor 22 or the DC voltage source 19, the control unit 6 firstly turns off the charging relay 2 and the inrush current prevention switch 3 so that no electric power is supplied by the AC power source 1; then, the control unit 6 turns on the discharging switch 5. Next, the control unit 6 turns on the first semiconductor switching device 17 and the short-circuiting switch 21 and turns off the second semiconductor switching device 18. As a result, as indicated by the thick solid line in FIG. 4, the electric charges that have been accumulated in the smoothing capacitor 22 flow through a first discharging path that is configured with the positive electrode of the smoothing capacitor 22, the discharging switch 5, the inrush current prevention resistor 4, the reactor 13, the first semiconductor switching device 17, the second diode 16, the short-circuiting switch 21, and the negative electrode of the smoothing capacitor 22, in that order, so that electricity is discharged from the smoothing capacitor 22.

As indicated by the dotted line in FIG. 4, when the first semiconductor switching device 17 is turned off and the second semiconductor switching device 18 is turned on, the electric charges in the smoothing capacitor 22 is discharged through a discharging path that is configured with the positive electrode of the smoothing capacitor 22, the discharging switch 5, the inrush current prevention resistor 4, the reactor 13, the first diode 15, the second semiconductor switching device 18, the short-circuiting switch 21, and the negative electrode of the smoothing capacitor 22, in that order. This discharging path will be also referred to as the first discharging path.

Figure 5:
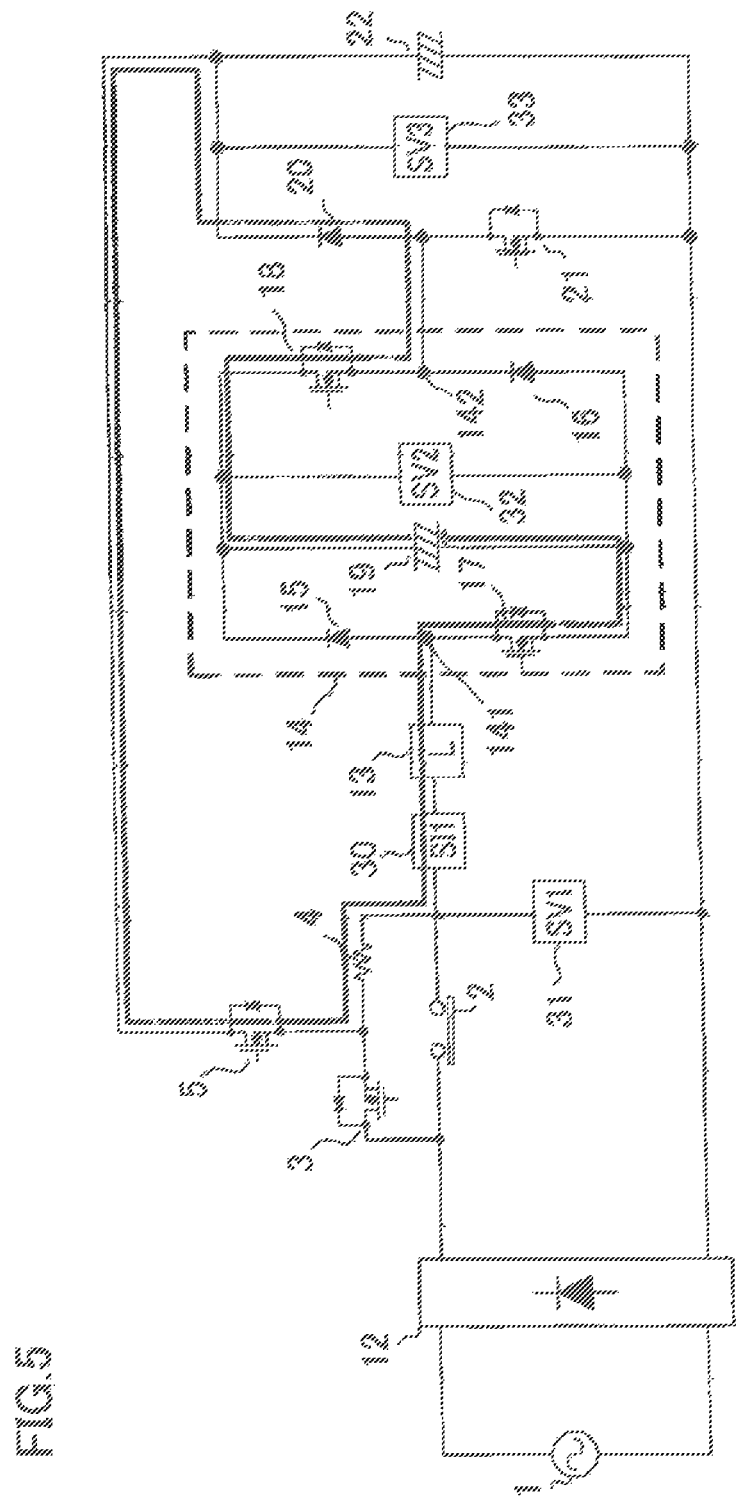
FIG. 5 is an explanatory diagram representing the path of a current flowing when electricity is discharged from a DC voltage source in an electric-power conversion system according to Embodiment 1 of the present invention.

Next, the operation of the DC voltage source 19 at a time when discharging is performed will be explained. FIG. 5 is an explanatory diagram representing the path of a current flowing when electricity is discharged from the DC voltage source in the electric-power conversion system according to Embodiment 1 of the present invention; a thick solid line indicates the path through which the electric charges that have been accumulated in the smoothing capacitor 19 flow into the electric-power conversion system according to Embodiment 1 of the present invention.

In FIG. 5, as described above, the control unit 6 turns off the charging relay 2 and the inrush current prevention switch 3 and turns on the discharging switch 5. Next, the control unit 6 turns on the first semiconductor switching device 17 and the second semiconductor switching device 18 and turns off the short-circuiting switch 21. As a result, as indicated by the thick solid line in FIG. 5, the electric charges that have been accumulated in the DC voltage source 19 flow through a second discharging path that is configured with the positive electrode of the DC voltage source 19, the second semiconductor switching device 18, the rectifier diode 20, the discharging switch 5, the inrush current prevention resistor 4, the reactor 13, the first semiconductor switching device 17, and the negative electrode of the DC voltage source 19, in that order, so that electricity is discharged from the DC voltage source 19.

Figure 6:
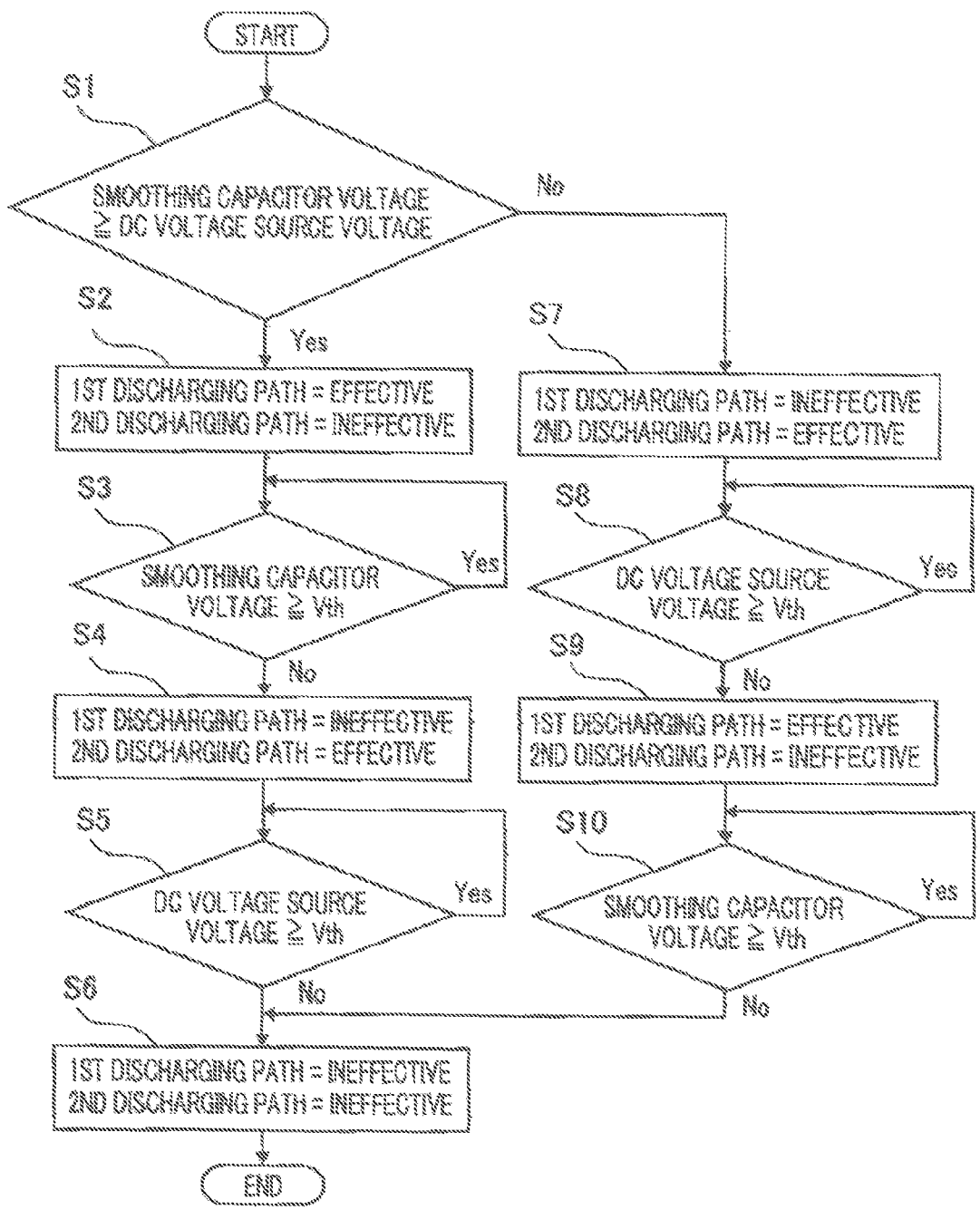
FIG. 6 is a flowchart representing determination algorithm for switching discharging paths in an electric-power conversion system according to Embodiment 1 of the present invention.

As described above, electric discharging from the smoothing capacitor 22 and electric discharging from the DC voltage source 19 are performed in the different discharging paths; therefore, the discharging paths need to be changed. FIG. 6 is a flowchart representing determination algorithm for switching discharging paths in an electric-power conversion system according to Embodiment 1 of the present invention. The discharging path changing determination is performed by the control unit 6. The determination algorithm represented in FIG. 6 corresponds to a switching unit in the control unit 6.

In FIG. 6, at first, in the step S1, the control unit 6 determines whether or not the voltage value of the smoothing capacitor 22 exceeds the voltage value of the DC voltage source 19; in the case where it is determined that the voltage value of the smoothing capacitor 22 is the same as or higher than the voltage value of the DC voltage source 19 (Yes), the step S1 is followed by the step S2, where circuit setting for the electric-power conversion circuit is performed in such a way that the first discharging path becomes effective and the second discharging path becomes ineffective. That is to say, as described above, the charging relay 2, the inrush current prevention switch 3, and the second semiconductor switching device 18 are turned off and the discharging switch 5, the first semiconductor switching device 17, and the short-circuiting switch 21 are turned on so that the first discharging path indicated by the thick solid line in FIG. 4 is established. It may be allowed that the first semiconductor switching device 17 is turned off and the second semiconductor switching device 18 is turned on; in that case, part of the first discharging path is the path indicated by the dotted line in FIG. 4. The first discharging path is established in such a manner, so that electricity is discharged from the smoothing capacitor 22 through the first discharging path.

Next, in the step S3, it is determined whether or not the voltage value of the smoothing capacitor 22 is the same as or higher than a predetermined threshold value Vth, which is a predetermined value. In the case where it is determined in the step S3 that the voltage value of the smoothing capacitor 22 is lower than the threshold value Vth (No), the step S3 is followed by the step S4, where circuit setting for the electric-power conversion circuit is performed in such a way that the first discharging path becomes ineffective and the second discharging path becomes effective. That is to say, as described above, the charging relay 2, the inrush current prevention switch 3, and the short-circuiting switch 21 are turned off and the discharging switch 5, the first semiconductor switching device 17, and the second semiconductor switching device 18 are turned on so that the second discharging path indicated by the thick solid line in FIG. 5 is established. As a result, electricity is discharged from the DC voltage source 19 through the second discharging path.

In contrast, in the case where it is determined in the step S3 that the voltage value of the smoothing capacitor 22 is the same as or higher than the threshold value Vth (Yes), the step S3 is repeated. Next, the step S4 is followed by the step S5, where it is determined whether or not the voltage value of the DC voltage source 19 is the same as or higher than the threshold value Vth. In the case where it is determined in the step S5 that the voltage value of the DC voltage source 19 is lower than the threshold value Vth (No), the step S5 is followed by the step S6, where the first discharging path and the second discharging path are set to be ineffective so that the discharging operation is ended. When both the first discharging path and the second discharging path need to be ineffective, it only necessary to turn off the first semiconductor switching device 17 and the second semiconductor switching device 18. In contrast, in the case where it is determined in the step S6 that the voltage value of the DC voltage source 19 is the same as or higher than the threshold value Vth (Yes), the step S5 is repeated.

In the case where it is determined in the step S1 that the voltage value of the smoothing capacitor 22 is lower than the voltage value of the DC voltage source 19 (No), the first discharging path is made ineffective and the second discharging path is made effective in the step S7 so that electricity is discharged from the DC voltage source 19. That is to say, the charging relay 2, the inrush current prevention switch 3, and the short-circuiting switch 21 are turned off and the discharging switch 5, the first semiconductor switching device 17, and the second semiconductor switching device 18 are turned on so that the second discharging path indicated by the thick solid line in FIG. 5 is established. As a result, electricity is discharged from the DC voltage source 19 through the second discharging path.

Next, in the step S8, it is determined whether or not the voltage value of the DC voltage source 19 is the same as or higher than the predetermined threshold value Vth. In the case where it is determined in the step S8 that the voltage value of the DC voltage source 19 is lower than the threshold value Vth (No), the first discharging path is set to be effective and the second discharging path is set to be ineffective in the step S9, so that electricity discharging from the smoothing capacitor 22 is started. That is to say, as described above, the charging relay 2, the inrush current prevention switch 3, and the second semiconductor switching device 18 are turned off and the discharging switch 5, the first semiconductor switching device 17, and the short-circuiting switch 21 are turned on so that the first discharging path indicated by the thick solid line in FIG. 4 is established and electricity is discharged from the smoothing capacity 22.

In contrast, in the case where it is determined in the step S8 that the voltage value of the DC voltage source 19 is the same as or higher than the threshold value Vth (Yes), the step S8 is repeated. Next, in the step S10, it is determined whether or not the voltage value of the smoothing capacitor 22 is the same as or higher than the predetermined threshold value Vth. In the case where it is determined in the step S10 that the voltage value of the smoothing capacitor 22 is lower than the threshold value Vth (No), the step S10 is followed by the step S6, where both the first discharging path and the second discharging path are set to be ineffective so that the discharging operation is ended. By turning off both the discharging switch 5 and the short-circuiting switch 21, both the first discharging path and the second discharging path can be made ineffective in the step S6. In contrast, in the case where it is determined in the step S10 that the voltage value of the smoothing capacitor 22 is the same as or higher than the threshold value Vth (Yes), the step S10 is repeated.

As a switching determination algorithm to be performed by the foregoing control unit 6, there has been represented a flowchart at a time when the threshold value is a voltage value; however, the present invention is not limited thereto, and for example, the switching determination may be performed by use of a current value as the threshold value. In other words, there is provided the current detection unit 30 for detecting a current flowing in the first discharging path or the second discharging path; the switching unit in the control unit 6 switches the discharging paths in such a way that when after, as described above, any one of the first discharging path and the second discharging path is made effective so that electricity is discharged from the smoothing capacitor or the DC voltage source, the current value detected by the current detection unit 30 is smaller than a predetermined value, the one discharging path that has been made effective is made ineffective and the other discharging path that has been made ineffective is made effective.

In the foregoing electric-power conversion system according to Embodiment 1 of the present invention, the inrush current prevention resistor 4 is connected in series between the output stage of the diode bridge 12 and the inverter circuit 14; however, the present invention is not limited thereto, and the inrush current prevention resistor 4 may be connected with the rear stage of the reactor 13 or the rear stage of the inverter circuit 14. In Embodiment 1 described above, the cathode of the rectifier diode 20 is connected with the positive electrode of the smoothing capacitor 22; however, when the anode of the rectifier diode 20 is connected with the negative electrode of the smoothing capacitor 22, the same operation as that of Embodiment 1 can be implemented.

Moreover, in Embodiment 1 described above, there has been explained the inverter circuit 14 that is formed of a single-phase inverter; however, as a variant example of Embodiment 1, the inverter circuit may be formed by connecting a plurality of single-phase inverters in series. In other words, FIG. 7 is a configuration diagram representing a variant example of electric-power conversion system according to Embodiment 1 of the present invention.

Figure 7:
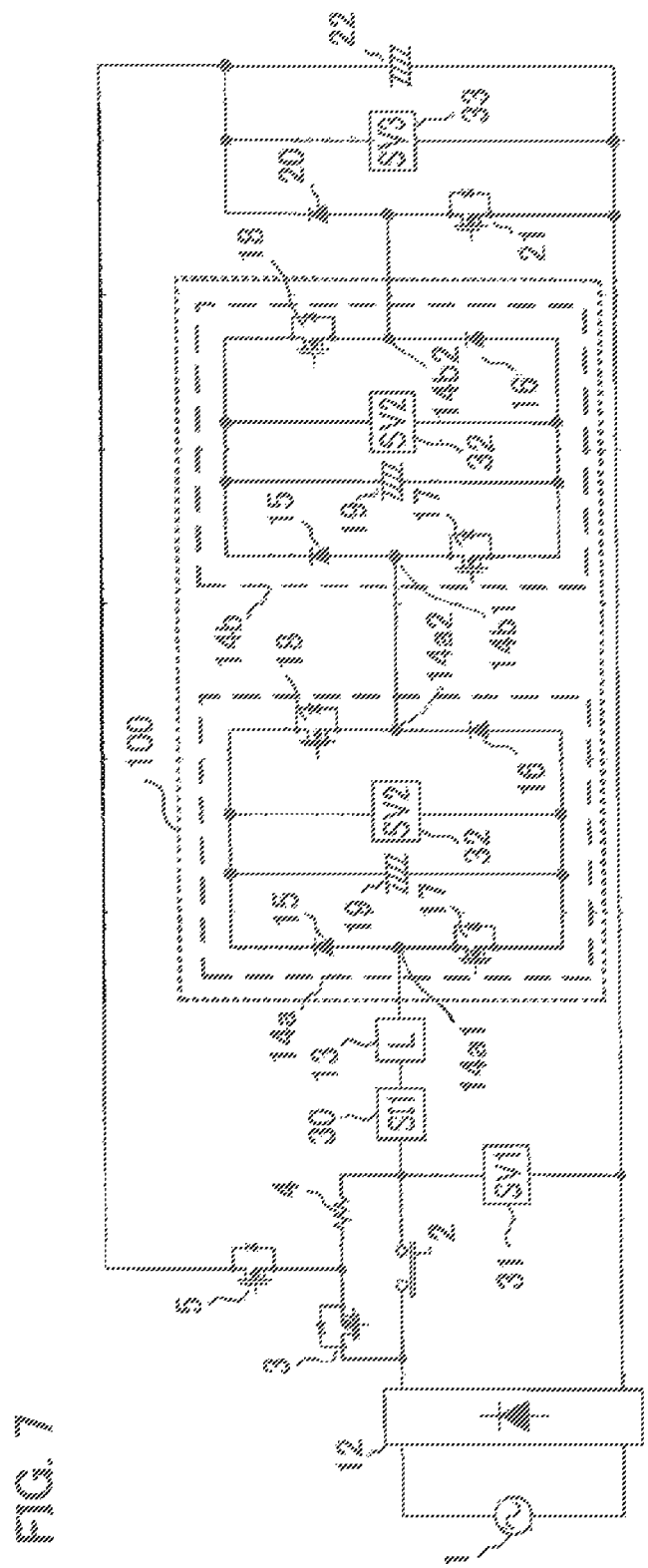
FIG. 7 is a configuration diagram representing a variant example of electric-power conversion apparatus according to Embodiment 1 of the present invention.

In FIG. 7, an inverter circuit 100 is configured with a first single-phase inverter 14a and a second single-phase inverter 14b. One end 14a1 of the first single-phase inverter 14a is connected with the rear stage of the reactor 13 and the other end 14a2 thereof is connected with one end 14b1 of the second single-phase inverter 14b. The connection point between the short-circuiting switch 21 and the rectifier diode 20 is connected with the other end 14b2 of the second single-phase inverter 14b. The respective voltages of the DC voltage source 19 of the first single-phase inverter 14a and the DC voltage source 19 of the second single-phase inverter 14b are set to be a single and the same voltage value. The respective AC terminals of the first single-phase inverter 14a and the second single-phase inverter 14b are connected in series with each other. The other configurations are the same as those in FIG. 1.

Also in the variant example of Embodiment 1, electricity discharging from the smoothing capacitor 22 and electricity discharging from the DC voltage source 19 of the first single-phase inverter 14a or from the DC voltage source 19 of the second single-phase inverter 14b are performed through different discharging paths; therefore, it is required to switch the discharging paths; however, the switching algorism is basically the same as the switching determination algorism for the discharging paths represented in FIG. 6. In the following explanation, there will be explained only the setting in the steps S2 and S9 in which the first discharging path is made effective and the second discharging path is made ineffective, the setting in the steps S4 and S7 in which the first discharging path is made ineffective and the second discharging path is made effective, and the setting in the step S6 in which the first discharging path is made ineffective and the second discharging path is made ineffective.

At first, the setting in the steps S2 and S9 in which the first discharging path is made effective and the second discharging path is made ineffective is performed in such a way that the charging relay 2, the inrush current prevention switch 3, one of the first and second semiconductor switching devices 17 and 18 in the first single-phase inverter 14a, and one of the first and second semiconductor switching devices 17 and 18 in the second single-phase inverter 14b are turned off and the discharging switch 5, the other one of the first and second semiconductor switching devices 17 and 18 in the first single-phase inverter 14a, the other one of the first and second semiconductor switching devices 17 and 18 in the second single-phase inverter 14b, and the short-circuiting switch 21 are turned on. As a result, the first discharging path is established without passing through the respective DC voltage sources 19 of the first and second single-phase inverters 14a and 14b; then, electric discharging from the smoothing capacitor 22 through the first discharging path is started.

Next, the setting in the steps S4 and S7 in which the first discharging path is made ineffective and the second discharging path is made effective is performed in such a way that the charging relay 2, the inrush current prevention switch 3, one of the first and second semiconductor switching devices 17 and 18 in the second single-phase inverter 14b, and the short-circuiting switch 21 are turned off and the discharging switch 5, the other one of the first and second semiconductor switching devices 17 and 18 in the second single-phase inverter 14b, and both the first and second semiconductor switching devices 17 and 18 in the first single-phase inverter 14a are turned on at the same time. As a result, the second discharging path for the DC voltage source 19 in the first single-phase inverter 14a is established without passing through the DC voltage sources 19 of the second single-phase inverter 14b; then, electric discharging from the DC voltage source 19 of the first single-phase inverter 14a can be started. Next, both the first and second semiconductor switching devices 17 and 18 in the second single-phase inverter 14b are turned on at the same time, one of the first and second semiconductor switching devices 17 and 18 in the first single-phase inverter 14a is turned on, and the other one of the first and second semiconductor switching devices 17 and 18 in the first single-phase inverter 14a is turned off. As a result, electric discharging from the DC voltage source 19 of the second single-phase inverter 14b can be performed without passing through the DC voltage sources 19 of the first single-phase inverter 14a.

When the first and second semiconductor switching devices 17 and 18 of the first single-phase inverter 14a and the first and second semiconductor switching devices 17 and 18 of the second single-phase inverter 14b are all turned on at the same time, it is made possible that electric discharging from the DC voltage source 19 of the first single-phase inverter 14a and electric discharging from the DC voltage source 19 of the second single-phase inverter 14b are concurrently performed; however, because in this case, the discharging current becomes large, it is desirable that as described above, electric discharging from the DC voltage source 19 of the first single-phase inverter 14a and electric discharging from the DC voltage source 19 of the second single-phase inverter 14b are separately performed.

Next, by turning off both the discharging switch 5 and the short-circuiting switch 21, both the first discharging path and the second discharging path can be made ineffective in the step S6.

Also in this variant example of Embodiment 1, the inrush current prevention resistor 4 is connected in series between the output stage of the diode bridge 12 and the inverter circuit 14; however, the present invention is not limited thereto; for example, it may be allowed that the inrush current prevention resistor 4 is connected in series between the first single-phase inverter 14a and the second single-phase inverter 14b.

Embodiment 2

Figure 8:
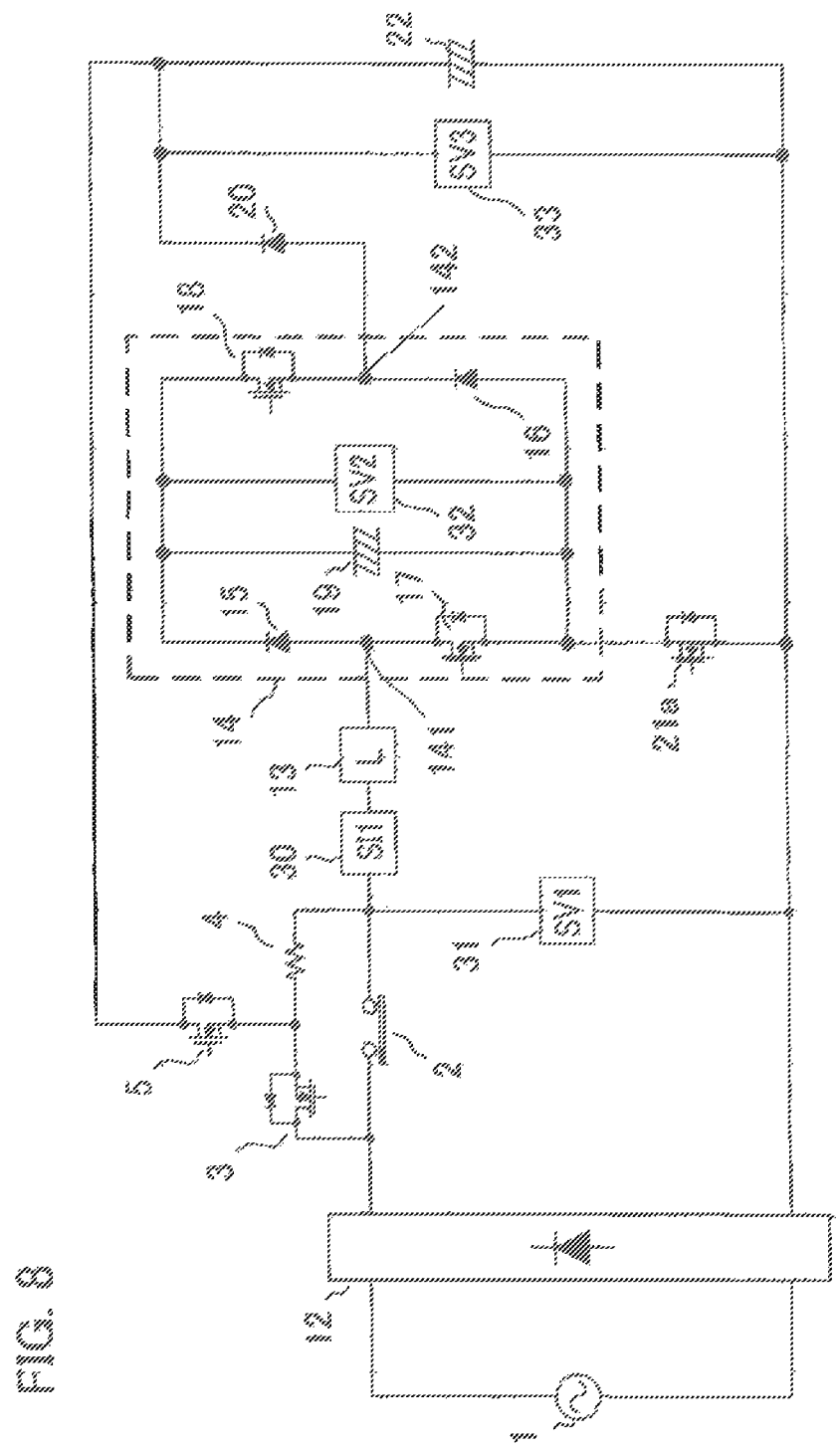
FIG. 8 is a configuration diagram of an electric-power conversion system according to Embodiment 2 of the present invention.

FIG. 8 is a configuration diagram of an electric-power conversion system according to Embodiment 2 of the present invention. An electric-power conversion system according to Embodiment 2 of the present invention differs from the electric-power conversion system according to Embodiment 1 in terms of the connection position of a short-circuiting switch 21a; however, other parts thereof are the same as those of the electric-power conversion system according to Embodiment 1. In the electric-power conversion system according to Embodiment 2 of the present invention, as illustrated in FIG. 8, the short-circuiting switch 21a is connected between the negative electrode of the DC voltage source 19 in the inverter circuit 14 and the negative electrode of the smoothing capacitor 22. Speaking more in detail, one end of the short-circuiting switch 21a is connected with the negative electrode of the DC voltage source 19, and the other end of the short-circuiting switch 21a is connected with the negative electrode of the diode bridge 12 and the negative electrode of the smoothing capacitor 22.

Figure 9:
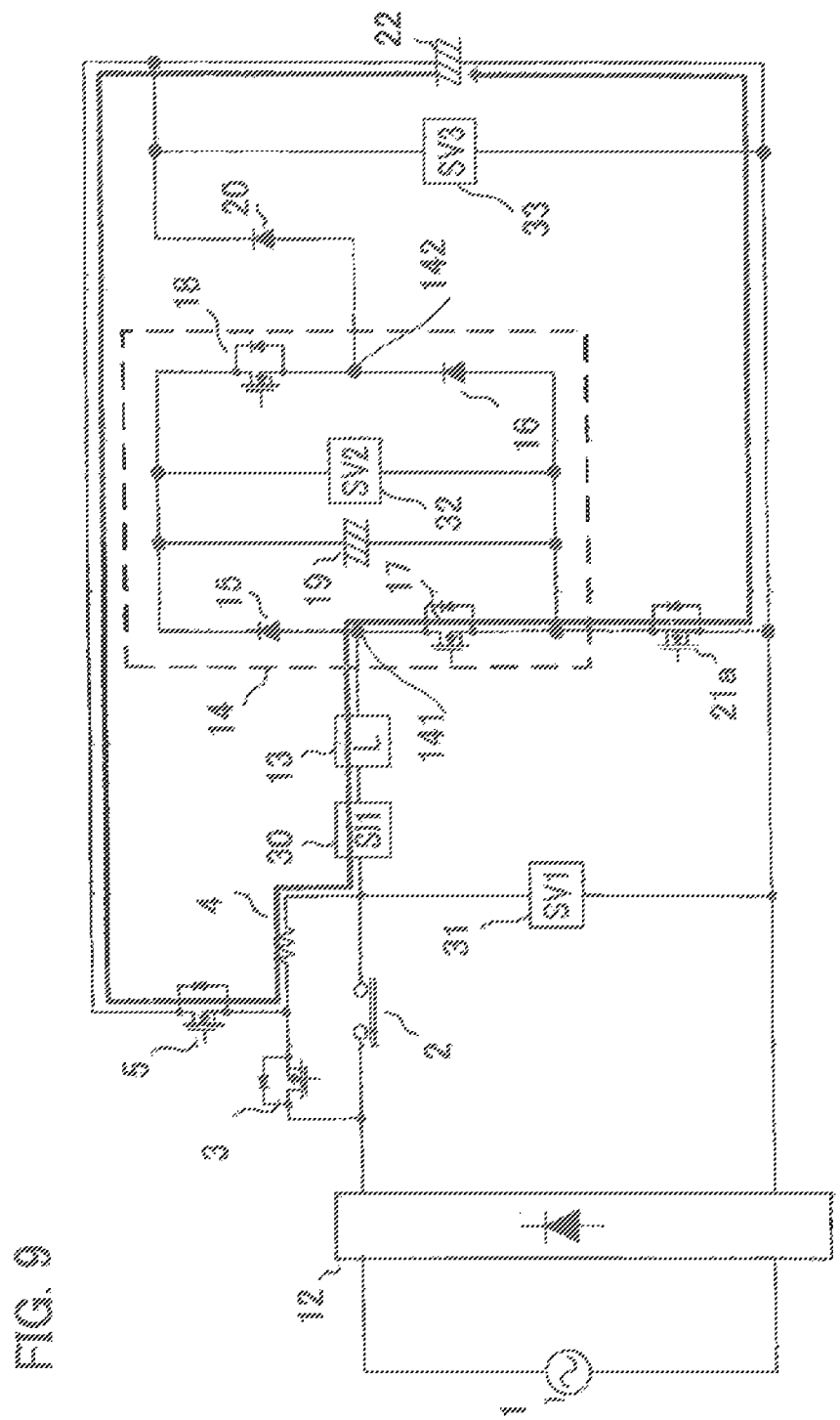
FIG. 9 is an explanatory diagram representing the path of a current flowing when electricity is discharged from a smoothing capacitor in an electric-power conversion system according to Embodiment 2 of the present invention.

In the electric-power conversion system according to Embodiment 2 of the present invention, electric discharging from the smoothing capacitor 22 is performed in the following manner. In other words, FIG. 9 is an explanatory diagram representing the path of a current flowing when electricity is discharged from the smoothing capacitor in the electric-power conversion system according to Embodiment 2 of the present invention. In FIG. 9, when electricity is discharged from the smoothing capacitor 22, the control unit 6 turns off the charging relay 2, the inrush current prevention switch 3, and the second semiconductor switching device 18 of the inverter circuit 14 and turns on the discharging switch 5, the first semiconductor switching device 17 of the inverter circuit 14, and the short-circuiting switch 21a. As a result, as indicated by a thick solid line, the electric charges that have been accumulated in the smoothing capacitor 22 flow through a first discharging path that is configured with the positive electrode of the smoothing capacitor 22, the discharging switch 5, the inrush current prevention resistor 4, the reactor 13, the first semiconductor switching device 17, the short-circuiting switch 21, and the negative electrode of the smoothing capacitor 22, so that electricity is discharged from the smoothing capacitor 22.

Figure 10:
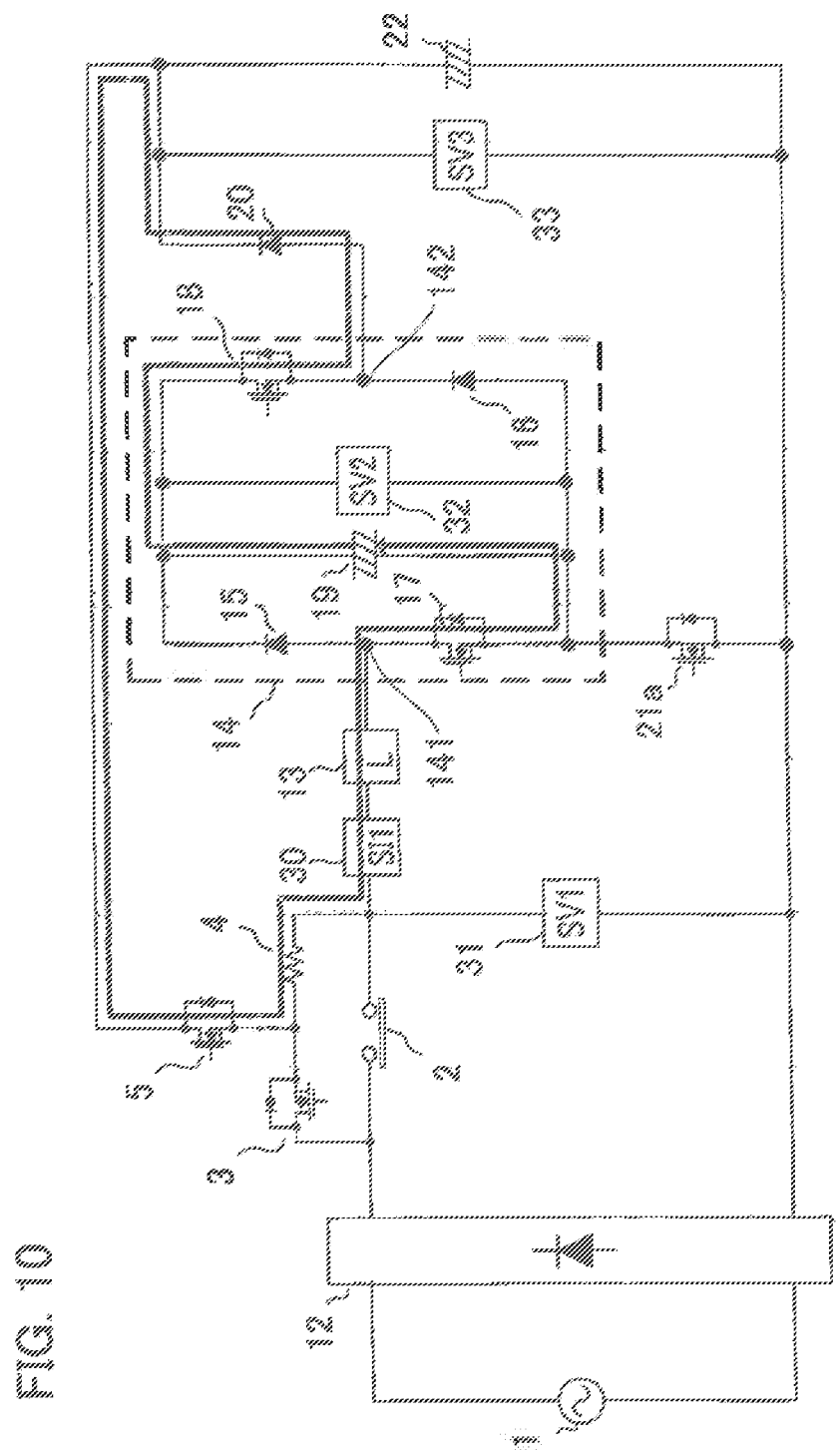
FIG. 10 is an explanatory diagram representing the path of a current flowing when electricity is discharged from a DC voltage source in an electric-power conversion system according to Embodiment 2 of the present invention.

Next, electric discharging from the DC voltage source 19 in the inverter circuit 14 is implemented in the following manner. In other words, FIG. 10 is an explanatory diagram representing the path of a current flowing when electricity is discharged from the DC voltage source in the electric-power conversion system according to Embodiment 2 of the present invention. In FIG. 10, when electricity is discharged from the DC voltage source 19, the control unit 6 turns off the charging relay 2, the inrush current prevention switch 3, and the short-circuiting switch 21a and turns on the discharging switch 5, the first semiconductor switching device 17, and the second semiconductor switching device 18. As a result, as indicated by the thick solid line in FIG. 10, the electric charges that have been accumulated in the DC voltage source 19 flow through a second discharging path that is configured with the positive electrode of the DC voltage source 19, the second semiconductor switching device 18, the rectifier diode 20, the discharging switch 5, the inrush current prevention resistor 4, the reactor 13, the first semiconductor switching device 17, and the negative electrode of the DC voltage source 19, so that electricity is discharged from the DC voltage source 19.

The electric-power conversion system according to Embodiment 2 of the present invention can demonstrate the same effect as the electric-power conversion system according to Embodiment 1. Because the short-circuiting switch 21a is connected with the negative electrode of the DC voltage source 19, the number of circuit elements, through which a current passes while the short-circuiting switch 21a is turned on, can be reduced; thus, the loads imposed on the circuit elements during electric discharging can be decreased. Moreover, the conduction loss of the electric-power conversion system can also be decreased, and hence there is demonstrated an effect that the conversion efficiency of the overall electric-power conversion system can be raised.

Moreover, in Embodiment 2 described above, there has been explained the inverter circuit 14 that is formed of a single-phase inverter; however, as a variant example of Embodiment 2, the inverter circuit may be formed by connecting a plurality of single-phase inverters in series. In other words, FIG. 11 is a configuration diagram representing a variant example of electric-power conversion system according to Embodiment 2 of the present invention.

Figure 11:
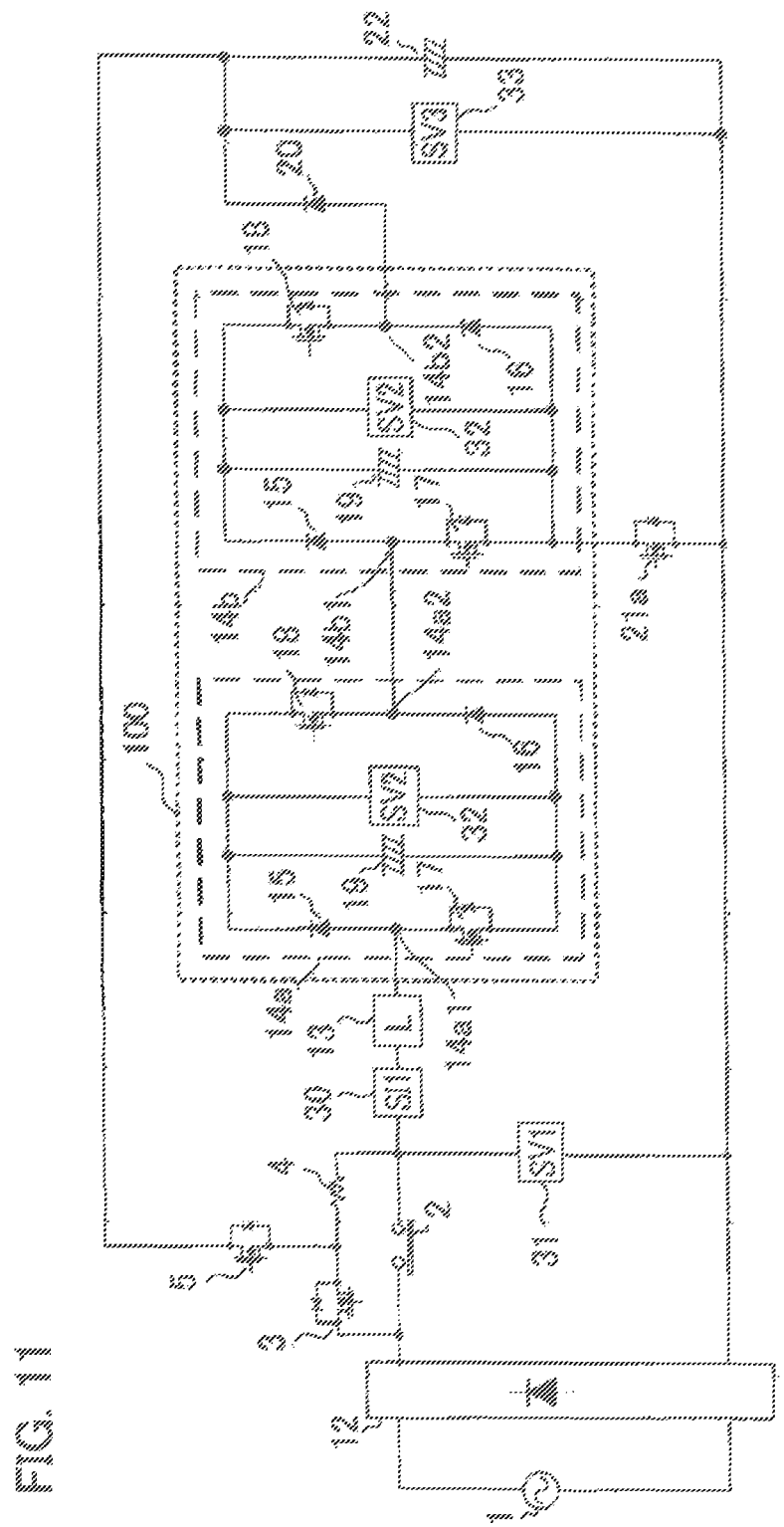
FIG. 11 is a configuration diagram representing a variant example of electric-power conversion apparatus according to Embodiment 2 of the present invention.

In FIG. 11, an inverter circuit 100 is configured with a first single-phase inverter 14a and a second single-phase inverter 14b. One end 14a1 of the first single-phase inverter 14a is connected with the rear stage of the reactor 13 and the other end 14a2 thereof is connected with one end 14b1 of the second single-phase inverter 14b. The anode of the rectifier diode 20 is connected with the other end 14b2 of the second single-phase inverter 14b. As described above, the respective AC terminals of the first single-phase inverter 14a and the second single-phase inverter 14b are connected in series with each other. The respective voltages of the DC voltage source 19 of the first single-phase inverter 14a and the DC voltage source 19 of the second single-phase inverter 14b are set to be a single and the same voltage value.

In the case where as illustrated in FIG. 11, a plurality of single-phase inverters 14a and 14b are connected in series with each other so as to configure the inverter circuit 100, the short-circuiting switch 21a is connected with the negative electrode of the DC voltage source 19 in the single-phase inverter 14b, among the plurality of single-phase inverters 14a and 14b, that is provided in the last stage, so that the inverter circuit 100 operates in the same manner as the inverter circuit illustrated in FIG. 10 and hence the same effect is demonstrated.

As is the case with FIG. 7 described above, there is implemented control of the first semiconductor switching device 17 and the second semiconductor switching device 18 of the first single-phase inverter 14a and the first semiconductor switching device 17 and the second semiconductor switching device 18 of the second single-phase inverter 14b at a time when electric discharging from the smoothing capacitor 22 is performed and at a time when electric discharging from the DC voltage source 19 of the first single-phase inverter 14a or electric discharging from the DC voltage source 19 of the second single-phase inverter 14b is performed.

Also in this variant example of Embodiment 2, the inrush current prevention circuit 7 is connected in series with the output stage of the diode bridge 12; however, the present invention is not limited thereto; for example, it may be allowed that the inrush current prevention circuit 7 is connected in series between the first single-phase inverter 14a and the second single-phase inverter 14b.

Embodiment 3

Figure 12:
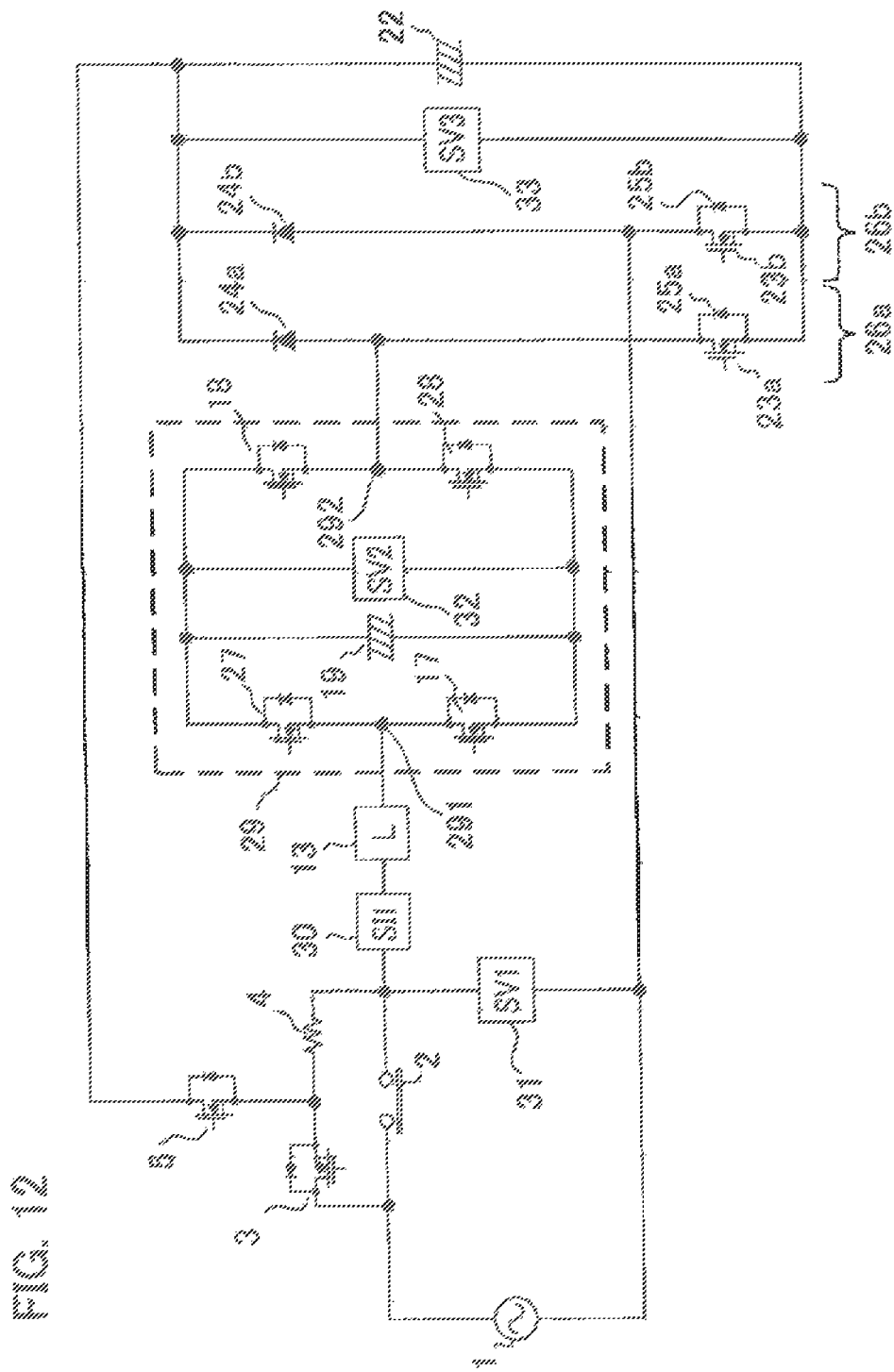
FIG. 12 is a configuration diagram of an electric-power conversion system according to Embodiment 3 of the present invention.

FIG. 12 is a configuration diagram of an electric-power conversion system according to Embodiment 3 of the present invention. As illustrated in FIG. 12, the electric-power conversion system according to Embodiment 3 of the present invention is not provided with the diode bridge 12, unlike each of Embodiments 1 and 2; one terminal of the AC power source 1 is connected directly with the charging relay 2, and the inrush current prevention switch 3 and the inrush current prevention resistor 4 are connected in parallel with the charging relay 2. The output stage of the charging relay 2 is connected with the rectified current detection circuit 30 and the reactor 13; one terminal 291 of an inverter circuit 29 including a single-phase inverter is connected with the rear stage of the reactor 13. The rectified voltage detection circuit 31 is provided in such a way as to be in parallel with the AC power source 1.

The inverter circuit 29 is configured with the first semiconductor switching device 17, the second semiconductor switching device 18, a third semiconductor switching device 27, and a fourth semiconductor switching device 28 that are each formed of an IGBT with which a diode is connected in an anti-parallel manner or a MOSFET, between the source and the drain of which a diode is connected in an anti-parallel manner, and the DC voltage source 19. The DC voltage source voltage detection circuit 32 is connected in parallel with the DC voltage source 19.

The other terminal 292 of the inverter circuit 29 is connected with the series connection point between a first short-circuiting switch 23a formed of a semiconductor switching device such as a MOSFET, with which a diode 25a is connected in an anti-parallel manner, and a first rectifier diode 24a. Furthermore, the other terminal of the AC power source 1 is connected with the series connection point between a second short-circuiting switch 23b formed of a semiconductor switching device such as a MOSFET, with which a diode 25b is connected in an anti-parallel manner, and a second rectifier diode 24b. The first short-circuiting switch 23a and the first rectifier diode 24a configure a first serial circuit 26a; the second short-circuiting switch 23b and the second rectifier diode 24b configure a second serial circuit 26b.

The first serial circuit 26a and the second serial circuit 26b are connected in parallel with each other; across the output stage thereof, the both terminals of the smoothing capacitor 22 are connected. The smoothing capacitor voltage detection circuit 33 is connected in parallel with the smoothing capacitor 22. In this case, each of the first short-circuiting switch 23a and the second short-circuiting switch 23b is not limited to a semiconductor switching device but may be formed of a mechanical switch; in that case, each of the diodes 25a and 25b is connected in an anti-parallel manner.

The electric-power conversion system according to Embodiment 3 of the present invention differs from each of the electric-power conversion systems according to Embodiments 1 and 2 in terms of the configurations of short-circuiting switches and the like; however, other parts thereof are the same as those of each of the electric-power conversion systems according to Embodiments 1 and 2.

Figure 13:
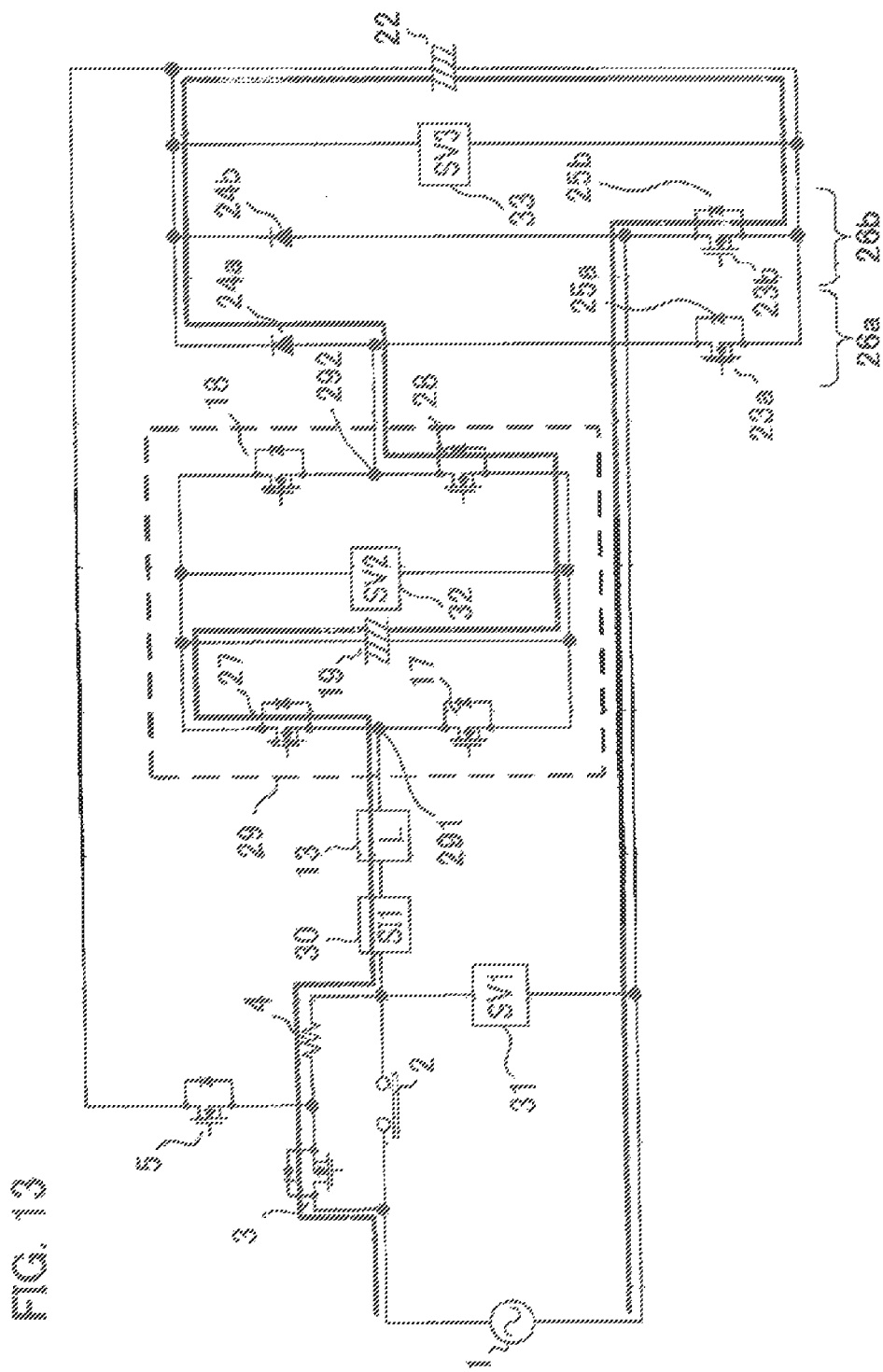
FIG. 13 is an explanatory diagram for explaining the operation of preventing an inrush current in an electric-power conversion system according to Embodiment 3 of the present invention.

FIG. 13 is an explanatory diagram for explaining the operation of preventing an inrush current in the electric-power conversion system according to Embodiment 3 of the present invention; a thick solid line indicates the path through which a current flows immediately after the operation starts. In FIG. 13, when the operation is started, the charging relay 2, the discharging switch 5, the first semiconductor switching device 17, the second semiconductor switching device 18, and the first short-circuiting switch 23a are turned off and the third semiconductor switching device 27, the fourth semiconductor switching device 28, and the second short-circuiting switch 23b are turned on. Then, in this situation, the inrush current prevention switch 3 is turned on.

As a result, as indicated by the thick solid line, a current flows through the AC power source 1, the inrush current prevention switch 3, the inrush current prevention resistor 4, the reactor 13, the third semiconductor switching device 27, the DC voltage source 19, the fourth semiconductor switching device 28, the first rectifier diode 24a, the smoothing capacitor 22, the second short-circuiting switch 23b, and the AC power source 1, in that order, so that the DC voltage source 19 and the smoothing capacitor 22 are charged. The value of the rush current is reduced by the inrush current prevention resistor 4.

Then, the charging relay 2, the first semiconductor switching device 17, and the first short-circuiting switch 23a are turned on and the inrush current prevention switch 3, and the third semiconductor switching device 27 are turned off, so that the path through which the current has flowed from the AC power source 1 is switched to a path that is configured with the AC power source 1, the charging relay 2, the reactor 13, the first semiconductor switching device 17, the fourth semiconductor switching device 28, the first short-circuiting switch 23a, the second short-circuiting switch 23b, and the AC power source 1, in that order.

Figure 14:
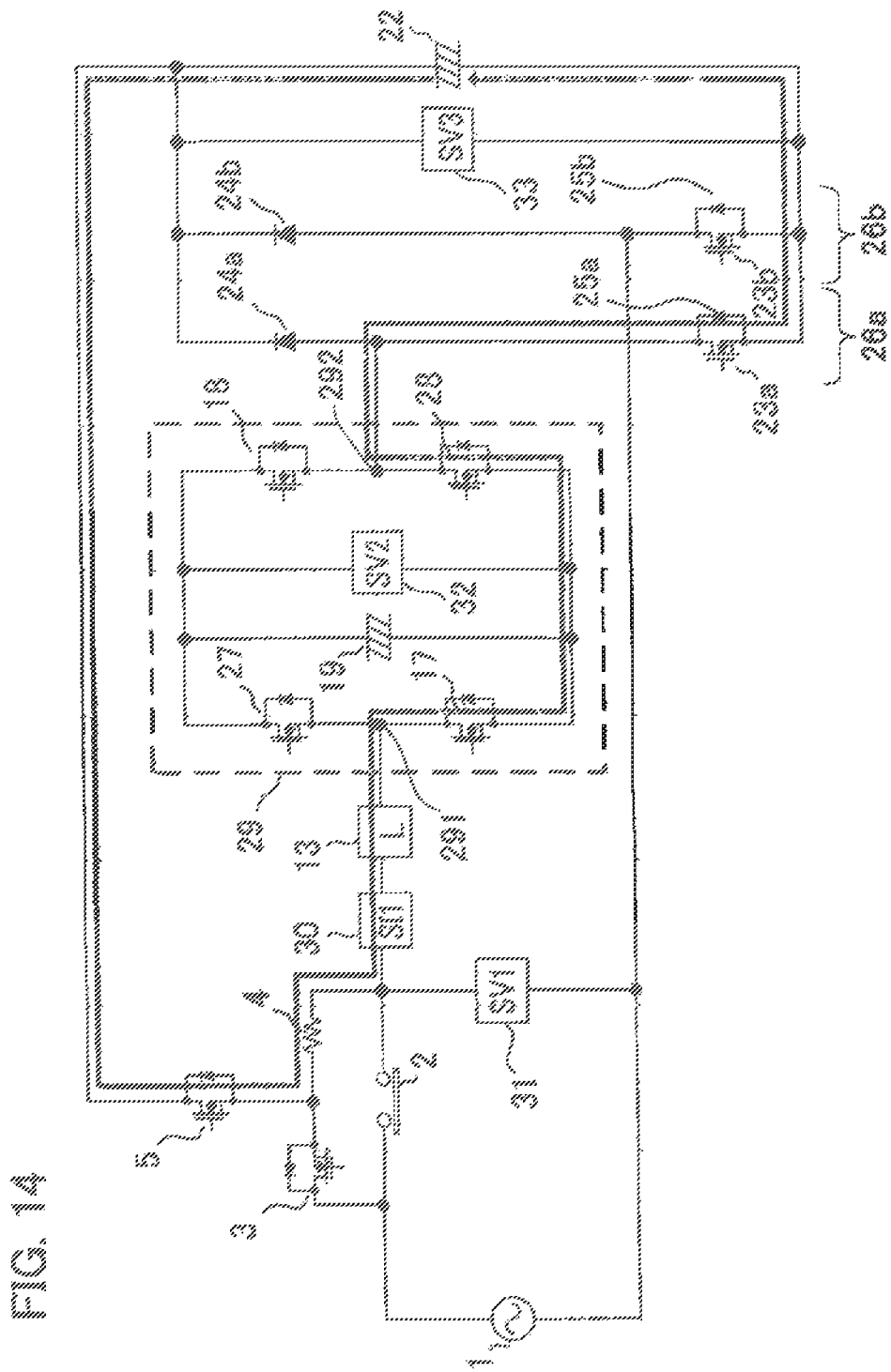
FIG. 14 is an explanatory diagram representing the path of a current flowing when electricity is discharged from a smoothing capacitor in an electric-power conversion system according to Embodiment 3 of the present invention.

Next, the operation of the smoothing capacitor 22 will be explained. FIG. 14 is an explanatory diagram representing the path of a current flowing when electricity is discharged from the smoothing capacitor in the electric-power conversion system according to Embodiment 3 of the present invention. At first, the charging relay 2, the inrush current prevention switch 3, the second semiconductor switching device 18, the third semiconductor switching device 27, and the second short-circuiting switch 23b are turned off and the discharging switch 5, the first semiconductor switching device 17, the fourth semiconductor switching device 28, and the first short-circuiting switch 23a are turned on.

As a result, as indicated by a thick solid line in FIG. 14, the electric charges that have been accumulated in the smoothing capacitor 22 flow through a first discharging path that is configured with the positive electrode of the smoothing capacitor 22, the discharging switch 5, the inrush current prevention resistor 4, the reactor 13, the first semiconductor switching device 17, the fourth semiconductor switching device 28, the first short-circuiting switch 23a, and the negative electrode of the smoothing capacitor 22, in that order, so that electricity is discharged from the smoothing capacitor 22.

Figure 15:
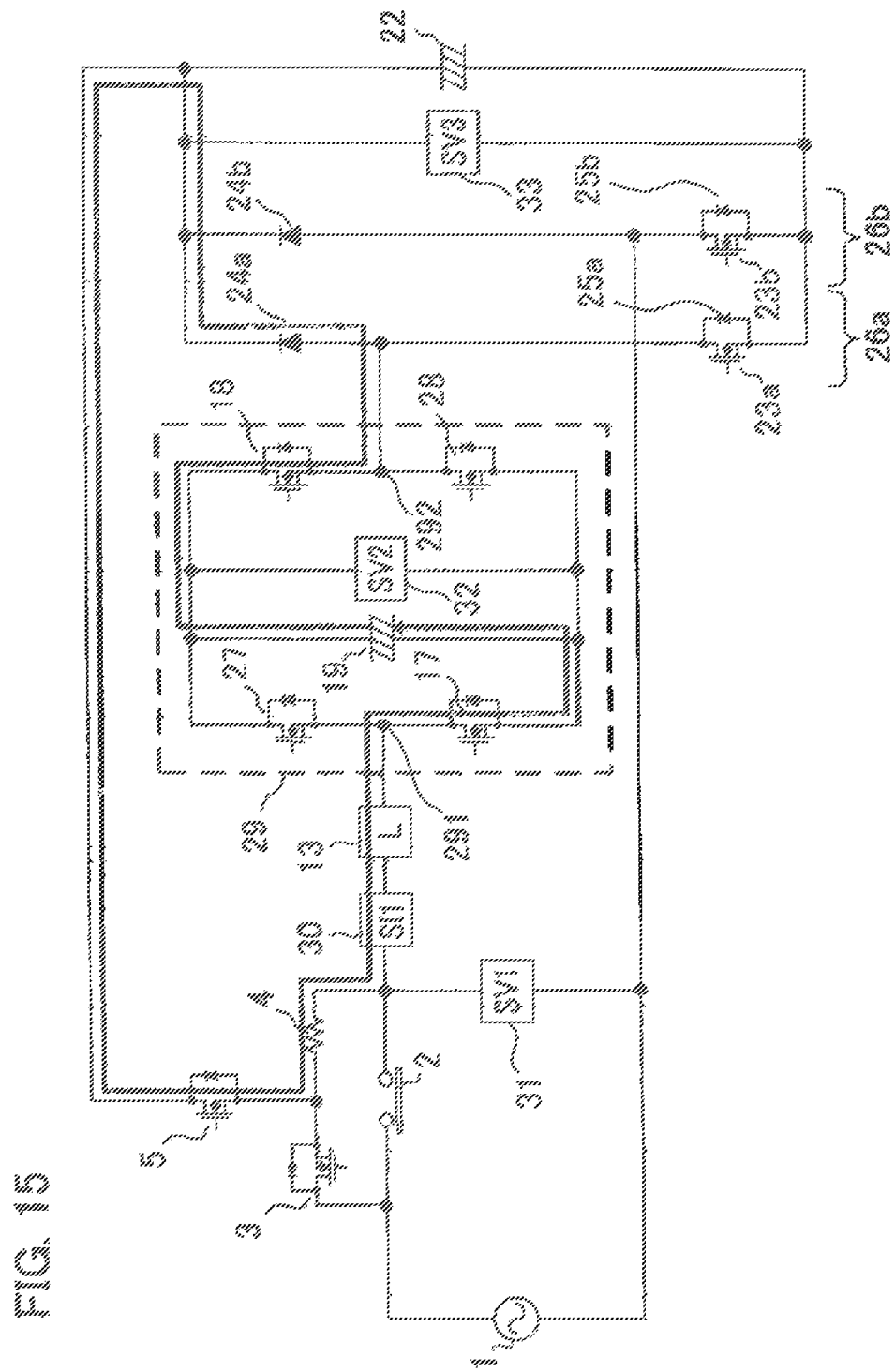
FIG. 15 is an explanatory diagram representing the path of a current flowing when electricity is discharged from a DC voltage source in an electric-power conversion system according to Embodiment 3 of the present invention.

Next, the operation of electric discharging from the DC voltage source 19 in the inverter circuit 29 will be explained. FIG. 15 is an explanatory diagram representing the path of a current flowing when electricity is discharged from the DC voltage source in the electric-power conversion system according to Embodiment 3 of the present invention. In order to discharge electricity from the DC voltage source 19, at first, the charging relay 2, and the inrush current prevention switch 3 are turned off; then, the discharging switch 5, the first semiconductor switching device 17, the second semiconductor switching device 18 are turned on and the third semiconductor switching device 27, the fourth semiconductor switching device 28, the first short-circuiting switch 23a, and the second short-circuiting switch 23b are turned off.

As a result, as indicated by a thick solid line in FIG. 15, the electric charges that have been accumulated in the DC voltage source 19 flow through a second discharging path that is configured with the positive electrode of the DC voltage source 19, the second semiconductor switching device 18, the first rectifier diode 24a, the discharging switch 5, the inrush current prevention resistor 4, the reactor 13, the first semiconductor switching device 17, and the negative electrode of the DC voltage source 19, in that order, so that electricity is discharged from the DC voltage source 19.

Embodiment 3 makes it possible to obtain the same effect as Embodiment 1; moreover, because the diode bridge 12, which is utilized in Embodiment 1, is not required, the number of components can be reduced and hence the configuration of the system is simplified. Moreover, because the number of devices through which a current passes can be reduced, the conduction loss can be decreased and the conversion efficiency of the overall electric-power conversion system can be raised.

Also in Embodiment 3, as illustrated in FIG. 7 that represents the variant example of Embodiment 1, the inverter circuit 100 may be configured with a plurality of single-phase inverters that are connected in series with one another. In this case, it may be allowed that the inrush current prevention resistor 4 is connected in series between the first single-phase inverter 14a and the second single-phase inverter 14b.

In Embodiments 1, 2, and 3, as the rectifying devices, the rectifier diodes 20, 24a, and 24b are connected with the smoothing capacitor 22; however, it may be allowed that instead of those rectifier diodes, semiconductor switches are connected therewith and the semiconductor switch is on/off-controlled so as to perform the same operation as the rectifier diode does.

In each of Embodiments 1, 2, and 3, the one end of the discharging switch 5 is connected with the positive electrode of the smoothing capacitor 22; however, the present invention is not limited thereto, and the one end of the discharging switch 5 may be connected with the negative electrode of the smoothing capacitor 22.

Embodiment 4

Figure 16:
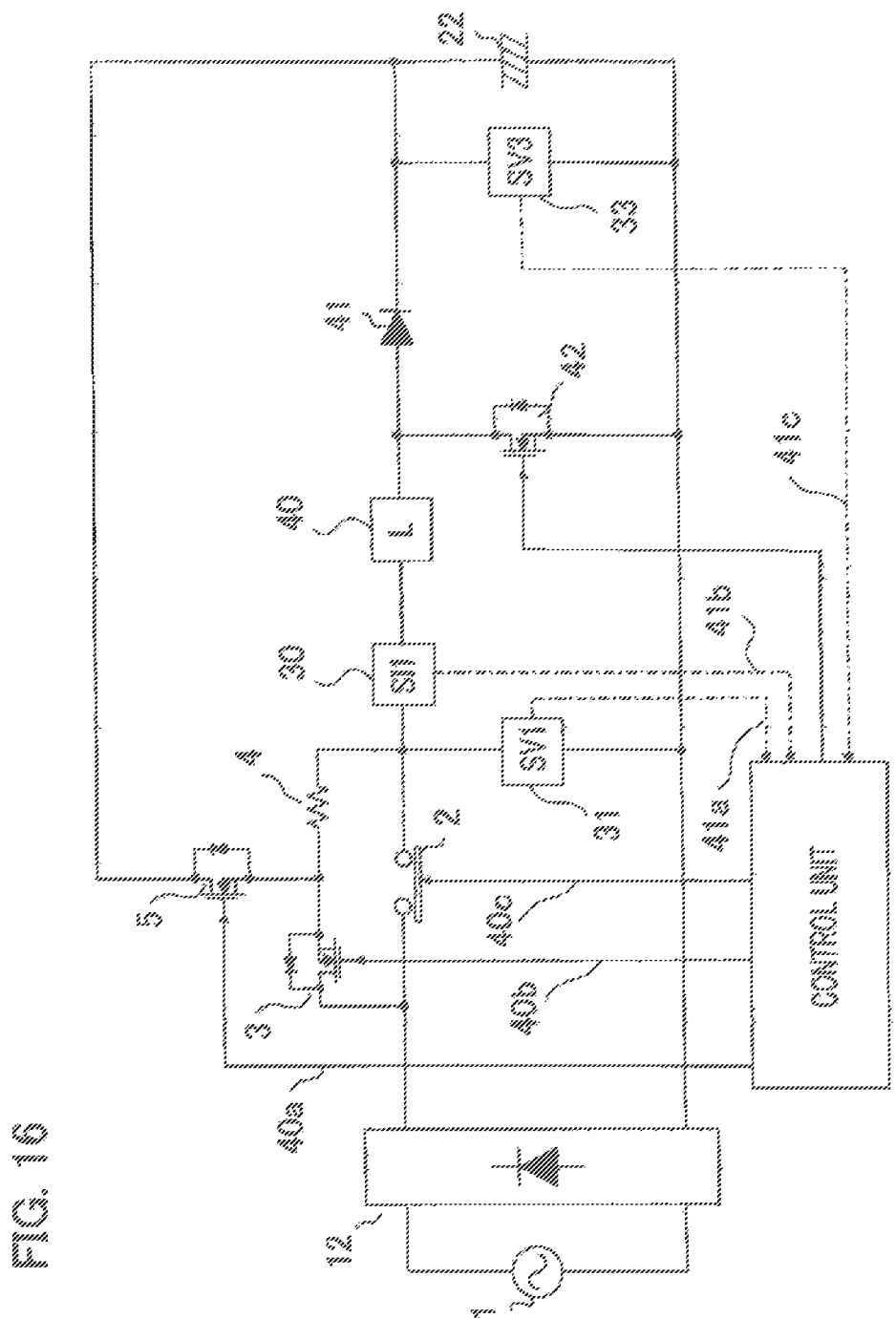
FIG. 16 is a configuration diagram of an electric-power conversion system according to Embodiment 4 of the present invention.
Figure 17:
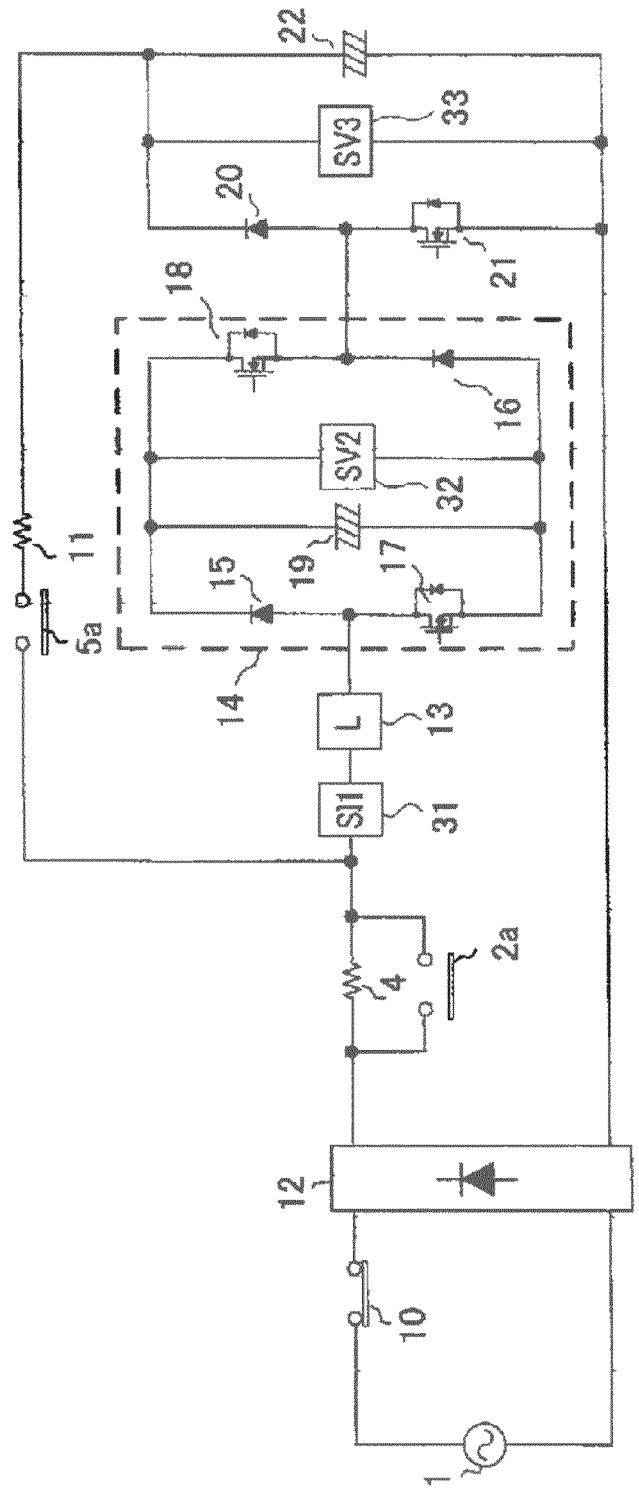
FIG. 17 is a configuration diagram of a conventional electric-power conversion system.

FIG. 16 is a configuration diagram of an electric-power conversion system according to Embodiment 4 of the present invention. In each of Embodiments 1 through 3, an inverter circuit formed of a single-phase inverter is provided; however, in Embodiment 4, a PFC (Power Factor Correction) converter is provided instead of the inverter circuit.

In FIG. 16, a semiconductor switching device 42, formed of an IGBT with which a diode is connected in an anti-parallel manner or a MOSFET with a diode contained therein in such a way as to be connected between the source and the drain thereof, and a diode 41, connected between one end of the semiconductor switching device 42 and one end of the smoothing capacitor 22, configure a PFC converter. The other configurations are the same as those in each of Embodiments 1 through 3.

The operation of the electric-power conversion system according to Embodiment 4 will be explained. In the case where when electric charging is started, the voltage value of the smoothing capacitor 22 detected by the smoothing capacitor voltage detection circuit 33 is smaller than a predetermined voltage value, the control unit 6 turns off the charging relay 2 and the discharging switch 5 and turns on the inrush current prevention switch. As a result, an inrush current from the diode bridge 12 is prevented. After that, in the case where it is determined that the voltage value of the smoothing capacitor 22 detected by the smoothing capacitor voltage detection circuit 33 is the same as or larger than the predetermined voltage value, the control unit 6 turns on the charging relay 2 and turns off the inrush current prevention switch 3 and the discharging switch 5. As a result, electricity is discharged from the smoothing capacitor 22 through a charging path that is configured with the AC power source 1, the diode bridge 12, the charging relay 2, a reactor 40, a rectifier diode 41, the smoothing capacitor 22, the diode bridge 12, and the AC power source 1, in that order.

Next, the operation of the electric-power conversion system at a time when electric discharging is performed will be explained. That is to say, in the case where the voltage value of the smoothing capacitor 22 detected by the smoothing capacitor voltage detection circuit 33 is the same as or larger than the predetermined voltage value, the control unit 6 turns off the charging relay 2 and the inrush current prevention switch 3 and turns on the discharging switch 5. As a result, the electric charges that have been accumulated in the smoothing capacitor 22 flow through a five discharging path that is configured with the positive electrode of the smoothing capacitor 22, the discharging switch 5, the inrush current prevention resistor 4, the reactor 40, the semiconductor switching device 42, and the negative electrode of the smoothing capacitor 22, in that order, so that electricity is discharged from the smoothing capacitor 22.

Embodiment 4 makes it possible to obtain the same effect as Embodiment 1; moreover, the number of components can be reduced and hence the configuration of the system is simplified. Moreover, because the number of devices through which a current passes can be reduced, the conduction loss can be decreased and the conversion efficiency of the overall electric-power conversion system can be raised.

INDUSTRIAL APPLICABILITY

The present invention can be applied to the field of an electric-power conversion system for converting AC electric power into DC electric power and is useful especially in the field of a vehicle electric-power conversion system mounted in a vehicle such as an automobile and in the automobile industry.

DESCRIPTION OF REFERENCE NUMERALS

1: AC power source
2: charging relay
3: inrush current prevention switch
4: inrush current prevention resistor
5: discharging switch
6: control unit
7: inrush current prevention circuit
12: diode bridge
13: reactor
14, 29, 100: inverter circuit
14a: 1st single-phase inverter
14b: 2nd single-phase inverter
15: 1st diode
16: 2nd diode
17: 1st semiconductor switching device
18: 2nd semiconductor switching device
19: DC voltage source
20: rectifier diode
21, 21a: short-circuiting switch
22: smoothing capacitor
23a: 1st short-circuiting switch
23b: 2nd short-circuiting switch
24a: 1st rectifier diode
24b: 2nd rectifier diode
25a, 25b: diode
26a: 1st serial circuit
26b: 2nd serial circuit
27: 3rd semiconductor switching device
28: 4th semiconductor switching device
30: rectified current detection circuit
31: rectified voltage detection circuit
32: DC voltage source voltage detection circuit
33: smoothing capacitor voltage detection circuit
40a, 40b, 40c, 40d, 40e, 40f: control line
41a, 41b, 41c: signal line

The invention claimed is:
1. An electric-power conversion system comprising:
an inverter circuit connected with a rear stage of an AC power source;
a smoothing capacitor connected with a rear stage of the inverter circuit via a rectifying device;
a charging switch that is connected with a front stage of the inverter circuit, that inputs an electric quantity based on an output of the AC power source to the inverter circuit when being turned on, and that cuts off an input of the electric quantity to the inverter circuit when being turned off;
an inrush current prevention circuit having an inrush current prevention switch and an inrush current prevention resistor that is connected in series with a rear stage of the inrush current prevention switch; and
a discharging switch, one terminal of which is connected to the inrush current prevention resistor and other terminal of which is connected to one terminal of the smoothing capacitor, and which is configured to connect and disconnect the smoothing capacitor to and from the inrush current prevention resistor,
wherein:
the inrush current prevention circuit is connected in parallel with the charging switch;
one terminal of the charging switch is connected with one terminal of the AC power source;
the inverter circuit is formed of a single-phase inverter including a first serial circuit in which a first semiconductor switching device and a third semiconductor switching device are connected in series with each other, a second serial circuit in which a second semiconductor switching device and a fourth semiconductor switching device are connected in series with each other, and a DC voltage source;
the first serial circuit and the second serial circuit are connected in parallel with each other; and
the DC voltage source is connected between the parallel connection points of the first serial circuit and the second serial circuit.

2. The electric-power conversion system according to claim 1, further including:
a control unit that performs on/off-control of the charging switch and the inrush current prevention switch; and
a voltage detection unit that detects a voltage value of the smoothing capacitor;

wherein:
the control unit performs the control, based on a voltage value of the smoothing capacitor detected by the voltage detection unit.

3. The electric-power conversion system according to claim 2, wherein:
when operation is started, the control unit turns off the charging switch and turns on the inrush current prevention switch.

4. The electric-power conversion system according to claim 2, wherein:
the control unit turns off the charging switch and turns on the inrush current prevention switch in the case where a voltage value detected by the voltage detection unit is smaller than a predetermined value; and
the control unit turns on the charging switch and turns off the inrush current prevention switch in the case where the voltage value detected by the voltage detection unit is the same as or larger than a predetermined value.

5. The electric-power conversion system according to claim 1,
wherein the, one terminal of the discharging switch is connected between the inrush current prevention switch and the inrush current prevention resistor, and
the discharging switch connects the one terminal of the smoothing capacitor with the front stage of the inrush current prevention resistor when being turned on and disconnects the one terminal of the smoothing capacitor from the front stage of the inrush current prevention resistor when being turned off.

6. The electric-power conversion system according to claim 5, further including:
a control unit that performs on/off-control of the charging switch, the discharging switch, and the inrush current prevention switch; and
a voltage detection unit that detects a voltage value of the smoothing capacitor,
wherein:
the control unit performs the control based on a voltage value of the smoothing capacitor detected by the voltage detection unit.

7. The electric-power conversion system according to claim 6, wherein:
the control unit turns off the charging switch and the inrush current prevention switch and turns on the discharging switch in the case where a voltage value detected by the voltage detection unit is the same as or larger than a predetermined value.

8. The electric-power conversion system according to claim 1, wherein:
the inverter circuit is configured with a plurality of the single-phase inverter circuits that are connected in series with one another.

9. The electric-power conversion system according to claim 1, further including:
a first rectifying device, one terminal of which is connected with the serial connection point between the second semiconductor switching device and the fourth semiconductor switching device and the other terminal of which is connected with the one terminal of the smoothing capacitor;
a second rectifying device, one terminal of which is connected with the other terminal of the AC power source and the other terminal of which is connected with the one terminal of the soothing capacitor;
a first short-circuiting switch connected between the one terminal of the first rectifying device and the other terminal of the smoothing capacitor; and
a second short-circuiting switch connected between the one terminal of the second rectifying device and the other terminal of the smoothing capacitor.

10. The electric-power conversion system according to claim 9, wherein there are provided:
a first discharging path including the discharging switch, the inrush current prevention resistor, at least one semiconductor switching device in the inverter circuit, the first short-circuiting switch, and the smoothing capacitor; and
a second discharging path including at least one semiconductor switching device in the inverter circuit, the first rectifying device, the discharging switch, the inrush current prevention resistor, and the DC power source;
wherein the electric-power conversion system further includes a control unit having a switching unit that switches the first discharging path and the second discharging path.

11. The electric-power conversion system according to claim 10, further including:
a smoothing capacitor voltage detection unit that detects a voltage value of the smoothing capacitor; and
a DC voltage source voltage detection unit that detects a voltage value of the DC power source;
wherein:
the switching unit performs the switching in such a manner that the switching unit compares the detected voltage value of the smoothing capacitor with the detected voltage value of the DC power source, that in the case where the voltage value of the smoothing capacitor is the same as or larger than the voltage value of the DC power source, the switching unit makes the first discharging path effective and the second discharging path ineffective, and that in the case where the voltage value of the smoothing capacitor is smaller than the voltage value of the DC power source, the switching unit makes the second discharging path effective and the first discharging path ineffective.

12. The electric-power conversion system according to claim 11, wherein:
in the case where after making effective one of the first discharging path and the second discharging path so that electricity is discharged from the smoothing capacitor or the DC voltage source, the voltage value of the smoothing capacitor or the DC voltage source from which electricity has been discharged becomes smaller than a predetermined value, the switching unit makes ineffective the one discharging path that has been made effective and makes effective the other discharging path that has been made ineffective.

13. The electric-power conversion system according to claim 11, further including:
a current detection unit that detects a current flowing in the first discharging path or the second discharging path;
wherein:
in the case where after making effective one of the first discharging path and the second discharging path so that electricity is discharged from the smoothing capacitor or the DC voltage source, the detected value of the current flowing in the discharging path becomes smaller than a predetermined value, the switching unit makes ineffective the one discharging path that has been made effective and makes effective the other discharging path that has been made ineffective.

14. The electric-power conversion system according to claim 1, further including:
a current limiting unit connected with the front stage or the rear stage of the inverter circuit.

* * * * *